US012786626B2

(12) United States Patent
Oomen et al.

(10) Patent No.: US 12,786,626 B2
(45) Date of Patent: Nov. 3, 2026

(54) ENVIRONMENTAL SOUND LOUDSPEAKER

(71) Applicant: LIQUID OXIGEN (LOX) B.V., Amsterdam (NL)

(72) Inventors: Paulus Oomen, Amsterdam (NL); Leendert De Klerk, Amsterdam (NL)

(73) Assignee: LIQUID OXIGEN (LOX) B.V., Amsterdam (NL)

( * ) Notice: Subject to any disclaimer, the term of this patent is extended or adjusted under 35 U.S.C. 154(b) by 260 days.

(21) Appl. No.: 18/578,244

(22) PCT Filed: Jul. 14, 2022

(86) PCT No.: PCT/NL2022/050415
§ 371 (c)(1),
(2) Date: Jan. 10, 2024

(87) PCT Pub. No.: WO2023/287291
PCT Pub. Date: Jan. 19, 2023

(65) Prior Publication Data

US 2024/0323602 A1 Sep. 26, 2024

(30) Foreign Application Priority Data

Jul. 14, 2021 (NL) ...................................... 2028723

(51) Int. Cl.
*H04R 3/02* (2006.01)
*H04R 1/40* (2006.01)
(Continued)

(52) U.S. Cl.
CPC ............... *H04R 3/02* (2013.01); *H04R 1/406* (2013.01); *H04R 3/005* (2013.01); *H04R 3/04* (2013.01); *H04R 2201/401* (2013.01)

(58) Field of Classification Search
CPC .......... H04R 3/02; H04R 1/406; H04R 3/005; H04R 3/04
See application file for complete search history.

(56) References Cited

U.S. PATENT DOCUMENTS 4,837,829 A 6/1989 Lobb
5,524,059 A 6/1996 Zurcher
(Continued)

FOREIGN PATENT DOCUMENTS

NL 2026361 B1 4/2022

OTHER PUBLICATIONS

Teutsch, H. and Elko, G. "First-and-Second-Order Adaptive Differential Microphone Arrays", 7th International Workshop on Acoustic Echo and Noise Control (IWAENC), Sep. 1, 2001, pp. 35-38.
(Continued)

*Primary Examiner* — Olisa Anwah
(74) *Attorney, Agent, or Firm* — Steven M. Koehler; Westman, Champlin & Koehler, P.A.

(57) ABSTRACT

An environmental sound loudspeaker comprises a system and/or method for capturing, processing, and immediately replaying the captured sounds. The loudspeaker comprises a loudspeaker driver, a signal processor, a first microphone and a second microphone positioned a distance d apart, diametrically opposite each other and equidistant relative to a center of the driver. The signal processor receives a first input signal from the first microphone and a second input signal from the second microphone, each input signal representing a recorded sound; determines an output signal based on the first and second input signals; optionally, manipulates or enhances the sound, and provides the output signal to the driver. The output signal comprises inverting the first input signal, combining the inverted first input signal with the second input signal, and amplifying the resulting signal to obtain a high-fidelity signal of environmental sounds captured by the first and/or second microphones.

19 Claims, 18 Drawing Sheets

(51) Int. Cl.
*H04R 3/00* (2006.01)
*H04R 3/04* (2006.01)

(56) References Cited

U.S. PATENT DOCUMENTS

| | | | |
|---|---|---|---|
| 2013/0236040 | A1 | 9/2013 | Crawford et al. |
| 2022/0084494 | A1* | 3/2022 | Chen ................ G10K 11/17827 |
| 2023/0306953 | A1 | 9/2023 | Oomen |

OTHER PUBLICATIONS

"How to Build a Phase Shifter with Arbitrary Phase Shift", Jun. 18, 2016, Retrieved from the Internet: URL: https://dsp.stackexchange.com/questions/31597/how-to-build-a-phase-shifter-witharbitrary-phase-shift.

International Search Report and Written Opinion in corresponding International Application No. PCT/NL2022/050415 dated Oct. 18, 2022.

* cited by examiner

ENVIRONMENTAL SOUND LOUDSPEAKER

FIELD OF THE INVENTION

This disclosure relates to systems and methods for capturing environmental sounds and immediately replaying the captured sounds.

BACKGROUND

Applications for sound in Virtual and Augmented Reality (VR/AR) generally aim to provide a lifelike experience of a virtual environment and/or an acoustically augmented environment. They typically simulate events—taking place in the virtual and/or acoustically augmented environment—that a subject can interact with. A common problem that such applications face is that the subject does not hear oneself (properly) reflected in the virtual environment, i.e., the real sounds produced by the subject, e.g., by means of voice and/or body movements, do not sound as if they take place in the virtual and/or augmented environment. Additionally, especially with regards to Mixed and/or Augmented Reality applications (XR/AR), one may also want to hear other environmental sounds, e.g., sounds produced by other (human) subjects and/or any other sound sources in the real environment that are reflected in the virtual environment. Thus, although the impression of a virtual environment may be convincingly simulated, as long as the subject does not hear oneself and the real environment reflected in the virtual and/or augmented environment, the simulation is perceptually incoherent. As a result, the experience is not lifelike and less physically and/or emotionally engaging than is desirable.

Many virtual, mixed, and augmented reality applications use a so-called closed system, wherein sounds are typically delivered to a user using headphones. In a closed system, capturing the sounds produced by the subject and/or by any other sources in the environment may involve a prohibitive amount of microphones and/or sensors placed on the subject(s) and/or throughout the environment to accurately process the audio and spatial/movement data. The data delivery to the subject would then further involve full simulation of each and every sound source in the real environment to be able to provide a convincing experience of each sound source in the virtual environment. This may require prior knowledge about the real environment and/or the sound sources present in the environment and/or the type of events occurring in the environment. Such a simulation may require a prohibitive amount of real-time data processing and may require data that is often impossible to obtain either prior or in real-time.

An example of a closed system is known from US 2013/0236040 A1. This document discloses a system to combine environmental sounds and augmented reality (AR) sounds. The system comprises headphones with speakers on the inside (directed towards the user's ears) and microphones on the outside, positioned close to the speakers but acoustically insulated from the speakers. The microphones capture ambient sounds, which may be processed (e.g. enhanced or suppressed, depending on the sound and the circumstances) before being fed to the respective speakers.

It may be understood that the complexity of the problem of delivering a convincing audio experience, and thus of a closed system, increases exponentially when one considers applications that involve a larger number of subjects sharing the same physical environment. As an example, one may consider the effects of acoustically enhanced environments on various interacting groups of human subjects, e.g., a group of people discussing during an assembly meeting or an audience attending a live concert; as well as non-human subjects, e.g., a swarm of bees moving across a meadow of flowers, birds communicating with each other across trees or distributed plant growth in an open field.

Alternatively, one could consider an open delivery to all subjects at once, e.g., by means of adding loudspeakers to the environment. This eliminates the necessity to capture data from each individual subject and/or sound source in the environment, as, instead, sound is captured on the level of the environment as a whole. However, a drawback of such an open system is the feedback that occurs when microphones are placed in the same environment as the loudspeakers and the captured environmental sound is played back in the same environment at a high gain in real-time. This is especially the case when omnidirectional microphones are used. Although omnidirectional microphones are particularly suitable to capture sound on the level of the environment as a whole, they are known to be particularly sensitive to produce feedback when played back in the environment in real-time. Consequently, omnidirectional microphones are not commonly used in the design of such systems.

Hence, there is a need in the art for a device that accurately captures environmental sound, i.e., the sound produced by subject(s) and any other sources in the environment, and is able to deliver the environmental sound as incorporated in a virtual and/or augmented environment in real-time in a simple and reliable, computationally inexpensive and perceptually coherent way.

SUMMARY

Hence, an environmental sound loudspeaker is disclosed. As used herein, an environmental sound loudspeaker is a device or system for capturing environmental sounds, processing the captured sounds, and immediately replaying the captured sounds.

In an aspect, this disclosure relates to an environmental sound loudspeaker comprising a loudspeaker driver, a first microphone pair, and a signal processor. The first microphone pair comprises a first microphone and a second microphone positioned a distance d apart, the first microphone and the second microphone being positioned diametrically opposite each other and equidistant relative to a centre of the loudspeaker driver. The signal processor may be configured to receive a first input signal from the first microphone and a second input signal from the second microphone, each input signal representing a recorded sound; determine an output signal based on the first and second input signals; and provide the output signal to the loudspeaker driver. The determination of the output signal may comprise inverting the first input signal and combining the inverted first input signal with the second input signal into a combined signal. The determination of the output signal may further comprise amplifying the combined signal and/or the first and second input signals to obtain a high-fidelity signal of environmental sounds captured by the first and/or second microphones for frequencies in an audible frequency range, preferably for all or at least substantially all frequencies in the audible frequency range. Preferably, the amplifying comprises attenuating signals with a frequency higher than a first transition frequency and/or boosting signals with a frequency lower than a second transition frequency, the first and second transition frequencies being based on the distance d between the first and second microphones.

The microphone pair may capture environmental sounds, which are to be played back by the loudspeaker driver. Because the microphones are placed equidistant from the loudspeaker driver, the phase shifting by the signal processor may prevent or at least greatly reduce feedback by effectively filtering out sound coming from the loudspeaker driver. Sounds produced by the loudspeaker driver may be referred to as non-environmental sounds. The output signal may be further processed, e.g. acoustically enhanced or mixed with other signals, before being provided to the loudspeaker driver.

The microphones in each microphone pair are identical to each other. Preferably, when an environmental sound loudspeaker comprises a plurality of microphone pairs, all microphones are identical. Preferably, the microphones are omnidirectional microphones. However, the inverting, phase-shifting (in case of a plurality of microphone pairs), and adding of the signals may amplify high-frequency sounds and attenuate low-frequency sounds. Therefore, a high-fidelity signal (with the contribution from the loudspeaker driver filtered out) may be restored, or at least approximated, by selectively amplifying the phase-shifted (where applicable) and combined signals, preferably by boosting the low-frequency signals in the audible spectrum with +6 dB per octave and attenuating the high-frequency signals in the audible spectrum with −3 dB per doubling of the number of microphones. For example, the attenuation a of the high-frequency signals may be given or approximated by $a(f)=-3\ dB\times\log_2(N)$, with N the number of microphones. Amplifying the signal may comprise applying one or more high-shelf filters and/or one or more low-shelf filters to the signal.

As used herein, an environmental sound may be any sound not directly produced by the loudspeaker driver of the environmental sound loudspeaker. Thus, environmental sounds may include sounds from sources external to the environmental sound loudspeaker. Environmental sounds may also include reflections of sounds produced by the loudspeaker driver of the environmental sound loudspeaker.

As used herein, a high-fidelity signal may refer to a signal, typically an output signal that has a frequency spectrum that is substantially the same as a frequency spectrum of a further signal, typically an input signal. In particular, a high-fidelity signal may refer to a signal that has a loudness balance that is substantially the same as the loudness balance of the environmental sounds captured by the first and/or second microphones for substantially all frequencies in an audible frequency range.

As used herein, a frequency spectrum may refer to a sound amplitude for frequencies in the audible spectrum. The frequency spectrum may also be referred to as a loudness balance. The audible spectrum, or audible frequency range, may comprises all frequencies between 20 Hz-15 kHz, or even all frequencies between 15 Hz-20 KHz.

As used herein, "immediately" replaying refers to replaying with a time delay that is not noticeable for a typical human listener. Preferably, the time delay is as short as possible, e.g., shorter than 10 ms, preferably shorter than 5 ms, more preferably shorter than 1 ms. In an analogue implementation, the time delay can be negligible, e.g. smaller than 0.1 ms.

As used herein, amplifying includes boosting (increasing the loudness) and attenuating (reducing the loudness) of an audio signal. High-frequency sounds may comprise sounds with a frequency larger than the first transition frequency. Low-frequency sounds may comprise sounds with a frequency smaller than the second transition frequency. In some implementation, the first and second transition frequencies may be the same frequency. There are several possible definitions for the first and second transition frequencies. The skilled person understands that if a different definition of a transition frequency is used, properties (e.g. filter parameters) that are expressed in terms of a transition frequency, may have to be adjusted accordingly. In general, the transition frequency depends on at least the distance between the microphones in a pair of microphones, and optionally on the number and orientation of microphone pairs. For instance, the first transition frequency may be defined as the frequency corresponding to a wavelength of twice the distance between the microphones in a pair of microphones.

In an embodiment, the environmental sound loudspeaker comprises one or more additional microphone pairs. Each additional microphone pair comprises a first additional microphone and a second additional microphone positioned the distance d apart, and the first and second additional microphones in each additional microphone pair are positioned diametrically opposite each other relative to the centre of the loudspeaker driver. Preferably, the microphone pair and the one or more additional microphone pairs are arranged symmetrically around the centre of the loudspeaker driver. In such an embodiment, the signal processor is further configured to, for each of the one or more additional microphone pairs, receive a first additional input signal from the first additional microphone and a second additional input signal from the second additional microphone. The determination of the output signal may further comprise, for each additional microphone pair, inverting the first additional input signal and combine the inverted first additional input signal with the second additional input signal into a combined additional signal. The determination of the output signal may further comprise applying a phase shift to the combined additional signal, the phase shift being based on an angle between an axis between the first and second microphones and an additional axis between the first and second additional microphones. The determination of the output signal may further comprise combining the phase-shifted additional signal with the combined signal. In such an embodiment, the second transition frequency may further be based on the number of microphone pairs.

The first microphone pair and optionally the one or more additional microphone pairs may together be referred to as the one or more microphone pairs.

By adding additional microphone pairs, the directional sensitivity of the environmental sound loudspeaker may be improved.

In an embodiment, the first microphone pair and the one or more additional microphone pairs are equally distributed on a circle, the centre of the circle coinciding with the centre of the loudspeaker driver, the phase shift $\Delta\varphi_i$ for the i-th additional microphone pair being equal to $\Delta\varphi=i\times 360°/N$, with N the number of microphones. Preferably the environmental sound loudspeaker comprises exactly one additional microphone pair placed orthogonally to the first microphone pair. In such an embodiment, the phase shift may be equal to 90°.

In an embodiment, the first microphone pair and the one or more additional microphone pairs are equally distributed on a sphere, the centre of the sphere coinciding with the centre of the loudspeaker driver. Preferably, the environmental sound loudspeaker comprises exactly two additional microphone pairs, the first microphone pair and the two additional microphone pairs being placed on the axes of a cartesian coordinate system with an origin in the centre of the loudspeaker driver and the phase shift being equal to 90°.

In an embodiment, the environmental sound loudspeaker further comprises an acoustic module for sound manipulation, e.g., adding reverberation and/or virtual acoustics to a signal provided to the acoustic module, preferably to the output signal. Thus, the determination of the output signal may comprise the acoustic module modifying the output signal. This way, virtual or augmented reality effects may be achieved based on and/or comprising the environmental sounds.

In an embodiment, the environmental sound loudspeaker further comprises an external signal input for receiving an external input signal, the external input signal encoding a sound, and wherein the determination of the output signal further comprises combining the external input signal with the signal generated by the signal processor. This way, the environmental sounds may be mixed with other sounds, e.g. sounds from virtual sound sources or musical sounds.

In an embodiment, the amplifying comprises attenuating signals with a frequency higher than a first transition frequency with −3 dB for the first microphone pair and, optionally, for each doubling of the number of microphone pairs. The number of microphone pairs may be equal to the number of additional microphone pairs plus one (for the first microphone pair). Additionally or alternatively, the amplifying comprises boosting signals with a frequency lower than a second transition frequency with +6 dB per octave.

The first transition frequency $f_{t,1}$ may be defined by $$f_{t,1} = \frac{v}{2d}.$$

The second transition frequency may be approximately equal to $$f_{t,2} = 0.4\frac{v}{\sqrt{N}\,d}.$$

Herein, v denotes the speed of sound and N denotes the number of microphones. Alternatively, the second transition frequency may be the same frequency as the first frequency, and the amplifying may further comprise attenuating signals with a frequency lower than the first transition frequency with −3 dB for the first microphone pair and, optionally, for each doubling of the number of microphone pairs.

In an embodiment, the amplifying comprises applying a series of low-shelf filters and/or applying a high-shelf filter. In an embodiment, the series of low-shelf filters is defined by a first transfer function $$H_{low,n}(f) = 1 + \frac{G_0 f_n}{f/(B^Q) + f_n}, \tag{1}$$

wherein $G_0$ denotes a gain factor preferably equal to $G_0=1$, B denotes a variable bandwidth preferably defined by $$B = \frac{f_n}{f},$$

Q denotes a Q-factor determining the slope of the gain curve, the Q-factor preferably being equal to Q=5, and wherein $f_n$ denotes a central frequency of the $n^{th}$ low-shelf filter (n=0, 1, . . . ), preferably $f_n$ being determined by $$f_n = \frac{1}{2^n}\frac{v}{2\sqrt{N}\,d}, \tag{2}$$

wherein v denotes the speed of sound, and N denotes the number of microphones. In an embodiment, the high-shelf filter is defined by a second transfer function $$H_{high}(f) = (1 - G_\infty) + \frac{G_\infty f_h}{f/(B^Q) + f_h}, \tag{3}$$

wherein $G_\infty$ denotes a gain factor preferably equal to $$G_\infty = 1 - \sqrt{\frac{1}{N}},$$

wherein N denotes the number of microphones, B denotes a variable bandwidth preferably defined by $$B = \frac{f_h}{f},$$

denotes a Q-factor determining the slope of the gain curve, the Q-factor preferably being equal to Q=5, and wherein $f_h$ denotes a central frequency of the high-shelf filter, preferably $f_h$ being determined by $$f_h = \frac{v}{2\sqrt{2}\,d},$$

wherein v denotes the speed of sound. The number of microphones is twice the number of microphone pairs.

Applying a phase shift $\Delta\varphi$ to a signal may comprise creating a first copy and a second copy of the signal; applying a Hilbert transform to the first copy to apply a 90° phase shift; amplifying the first copy with a first factor a, and the second copy with a second factor b; and combining the first and second copies and amplifying the combined copies with a third factor c. Herein the factors a, b, and c are selected such that $\Delta\varphi=\arctan(a/b)$ and $c=1/\sqrt{(a^2+b^2)}$.

Alternatively, applying a phase shift $\Delta\varphi$ to a signal may comprise creating a first copy and a second copy of the signal; applying a first frequency-dependent phase shift $\theta_A(f)$ to the first copy using one or more first all-pass filters with associated first corner frequencies $f_{0,A}(i)$ and first quality factors $Q_A(i)$, preferably the first frequency-dependent phase shift $\theta_A(f)$ being given by $$\theta_A(f) = -4\sum_{i=1}^{n}\arctan\left[\left(\frac{f}{f_{0,A}(i)}\right)^{Q_A(i)}\right];$$

applying a second frequency-dependent phase shift $\theta_B(f)$ to the second copy using one or more second all-pass filters with associated second corner frequencies $f_{0,B}(i)$ and second quality factors $Q_B(i)$, preferably the second frequency-dependent phase shift $\theta_B$ (f) being given by $$\theta_B(f) = -4\sum_{i=1}^{n}\arctan\left[\left(\frac{f}{f_{0,B}(i)}\right)^{Q_B(i)}\right];$$

and taking a difference between the first and second phase-shifted copies. The first and second corner frequencies and/or the first and second quality factors may be optimised such that $\Delta\varphi \approx \theta_A(f) - \theta_B(f)$ for all f in the audible frequency range. The number of terms n is equal to or larger than 1, for example 1, 2, 3, or 5.

In an embodiment, the environmental sound loudspeaker may be adapted for use under water. In an embodiment, the environmental sound loudspeaker may be adapted for aerial use. In an embodiment, the environmental sound loudspeaker may be adapted to generate sounds suitable to be heard by predefined non-human subjects.

In an aspect, this disclosure may relate to a method for recording, processing and immediately replaying sounds. The method may comprise receiving a first input signal from a first microphone and a second input signal from a second microphone, each input signal representing a recorded sound. The first microphone and the second microphone may form a first microphone pair, the first microphone and the second microphone being positioned a distance d apart, the first microphone and the second microphone being positioned diametrically opposite each other and equidistant relative to a centre of a loudspeaker driver. The method may further comprise determining an output signal based on the first and second input signals; optionally, manipulating the output signal, the manipulation preferably comprising adding reverberation and/or virtual acoustics to the output signal; and providing the, optionally manipulated, output signal to the loudspeaker driver. The determination of the output signal may comprise inverting the first input signal and combining the inverted first input signal with the second input signal into a combined signal. The determination of the output signal may further comprise amplifying the combined signal and/or the first and second input signals such that the amplified combined signal has a frequency spectrum that is substantially the same as a frequency spectrum of environmental sounds captured by the first and/or second microphones for frequencies in an audible frequency range, preferably the amplifying comprising attenuating signals with a frequency higher than a first transition frequency and/or boosting signals with a frequency lower than a second transition frequency, the first and second transition frequencies being based on the distance d between the first and second microphones.

In an embodiment, the method may further comprise receiving a first additional input signal from a first additional microphone and a second additional input signal from a second additional microphone from each of one or more additional microphone pairs. Each additional microphone pair comprises a first additional microphone and a second additional microphone positioned the distance d apart, the first and second additional microphones in each additional microphone pair being positioned diametrically opposite each other relative to the centre of the loudspeaker driver, the first microphone pair and the one or more additional microphone pairs being arranged symmetrically around the centre of the loudspeaker driver. In such an embodiment, the determination of the output signal may further comprise, for each additional microphone pair, inverting the first additional input signal and combining the inverted first additional input signal with the second additional input signal into a combined additional signal; applying a phase shift to the combined additional signal, the phase shift being based on an angle between an axis between the first and second microphones and an additional axis between the first and second additional microphones; and combining the phase-shifted additional signal with the combined signal. In an embodiment, the second transition frequency is further based on the number of microphone pairs.

One aspect of this disclosure relates to a computer comprising a computer readable storage medium having computer readable program code embodied therewith, and a processor, preferably a microprocessor, coupled to the computer readable storage medium, wherein responsive to executing the computer readable program code, the processor is configured to perform any of the methods described herein.

One aspect of this disclosure relates to a computer program or suite of computer programs comprising at least one software code portion or a computer program product storing at least one software code portion, the software code portion, when run on a computer system, being configured for executing any of the methods described herein.

One aspect of this disclosure relates to a non-transitory computer-readable storage medium storing at least one software code portion, the software code portion, when executed or processed by a computer, is configured to perform any of the methods described herein.

As will be appreciated by one skilled in the art, aspects of the present invention may be embodied as a system, a method or a computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by a processor/microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples of a computer readable storage medium may include, but are not limited to, the following: an electrical connection having one or more wires, a portable computer diskette, a hard disk, a random access memory (RAM), a read-only memory (ROM), an erasable programmable read-only memory (EPROM or Flash memory), an optical fibre, a portable compact disc read-only memory (CD-ROM), an optical storage device, a magnetic storage device, or any suitable combination of the foregoing. In the context of the present invention, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fibre, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or a central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

Moreover, a computer program for carrying out the methods described herein, as well as a non-transitory computer readable storage-medium storing the computer program are provided. A computer program may, for example, be downloaded (updated) to the existing data processing systems or be stored upon manufacturing of these systems.

Elements and aspects discussed for or in relation with a particular embodiment may be suitably combined with elements and aspects of other embodiments, unless explicitly stated otherwise. Embodiments of the present invention will be further illustrated with reference to the attached drawings, which schematically will show embodiments according to the invention. It will be understood that the present invention is not in any way restricted to these specific embodiments.

BRIEF DESCRIPTION OF THE FIGURES

Aspects of the invention will be explained in greater detail by reference to exemplary embodiments shown in the drawings, in which.

DETAILED DESCRIPTION

In the figures, identical reference numbers indicate similar or identical elements. Further, elements that are depicted with dashed lines are optional elements. It should be understood that in general, components may be performed in alternative order, by using a signal process that may differ from what is illustrated, and that not all steps are required in every embodiment. In other words, one or more steps may be omitted or replaced, performed in different orders, in parallel with one another and/or additional steps may be added, without departing from the scope of the invention.

This disclosure relates to methods and systems for recording environmental sounds and immediately playing back those sounds, possibly in a modified form and/or combined with other sounds. The methods and systems described herein enable acoustically highly realistic augmented reality (AR), mixed reality (XR) and virtual reality (VR) experiences, in particular for a plurality of simultaneous users.

Figure 1:
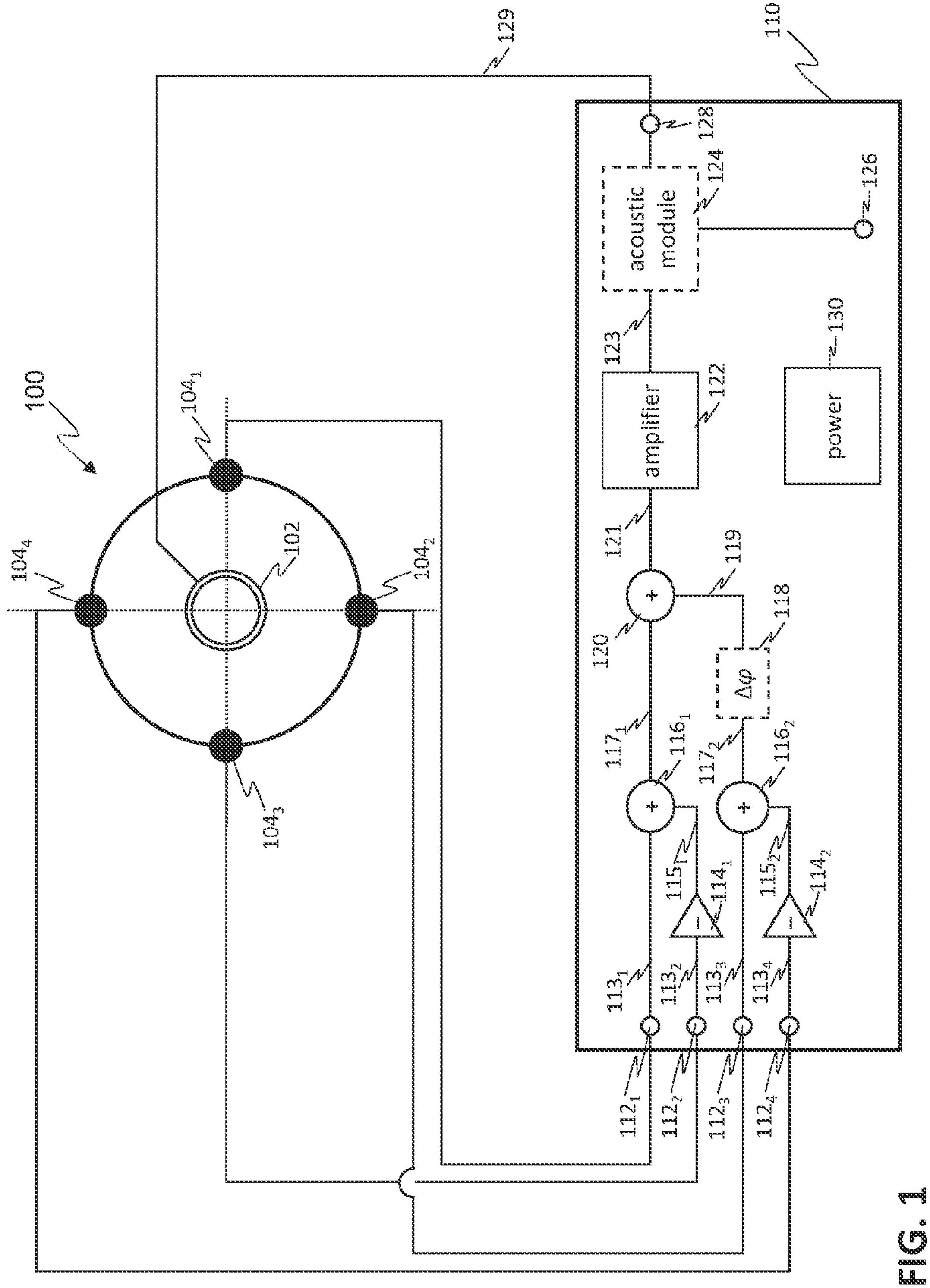
FIG. 1 schematically depicts an environmental sound loudspeaker according to an embodiment.

FIG. 1 schematically depicts an environmental sound loudspeaker according to an embodiment. The environmental sound loudspeaker 100 comprises a loudspeaker driver 102, for example a coaxial loudspeaker driver, and one or more pairs of microphones $\mathbf{104}_{1\text{-}4}$. In the depicted example, there are two pairs of microphones, the first pair consisting of microphones $\mathbf{104}_1$ and $\mathbf{104}_3$ and the second pair consisting of microphones $\mathbf{104}_2$ and $\mathbf{104}_4$. The microphones in a pair of microphones are placed diametrically and in an equidistant manner relative to the centre of the loudspeaker driver. The microphones in a pair of microphones are identical to each other. Preferably, the microphones are omnidirectional microphones. Preferably, when an environmental sound loudspeaker comprises a plurality of microphone pairs, all microphones are identical. Preferably, when an environmental sound loudspeaker comprises a plurality of microphone pairs, all microphones are placed at the same distance from the centre of the loudspeaker driver. Preferably, when an environmental sound loudspeaker comprises a plurality of microphone pairs, the pairs are distributed equally around the loudspeaker driver; for example, a first pair may be placed at angles of 0° and 180°, and a second pair may be placed at angles of 90° and 270°.

In some embodiments, the environmental sound loudspeaker may comprise a plurality of loudspeaker drivers, preferably identical loudspeaker drivers, and the microphones may be arranged symmetrically around the centre of mass of the loudspeaker drivers.

In some embodiments, the microphones and the loudspeaker driver(s) may be integrated in a single device, whereas in other embodiments, the microphones and the loudspeaker driver(s) may be implemented as a system of separate devices.

The environmental sound loudspeaker further comprises a signal processor 110. The signal processor is arranged to combine input signals from the microphones, typically into a single output signal 129 that can be provided to the loudspeaker driver. The signal processor is further arranged to provide feedback reduction. The signal processor is furthermore arranged to maintain or restore the fidelity of the combined input signals.

The signal processor 110 can be integrated into the loudspeaker device, or it can be (part of) a separate device. As depicted, the signal processor comprises a plurality of microphone signal inputs $\mathbf{112}_{1\text{-}4}$ for receiving input signals from microphones $\mathbf{104}_{1\text{-}4}$. In the depicted embodiment, there is one signal input for each individual microphone. In some embodiments, several inputs can be physically or logically combined. The connection between a microphone and an input can be wired or wireless. During transport, the signals from the microphones may be combined into a single data stream, to be separated into the constituent microphone signals after reception. However, in a preferred embodiment, each microphone is connected via a dedicated wire to the corresponding input. It should be noted that pairs of microphones are connected to pairs of inputs; in this example, inputs $\mathbf{112}_1$ and $\mathbf{112}_2$ form a first pair, receiving input from microphone pair $\mathbf{104}_1$ and $\mathbf{104}_3$, and inputs $\mathbf{112}_3$ and $\mathbf{112}_4$ form a second pair, receiving input from microphone pair $\mathbf{104}_2$ and $\mathbf{104}_4$.

One input $\mathbf{112}_{2,4}$ from each pair of inputs is connected to an inverter $\mathbf{114}_{1,2}$ which inverts the input signal $\mathbf{113}_{2,4}$ received from the corresponding microphone. Inverting a signal corresponds to applying a phase shift of 180° to the signal or, equivalently, to multiplying a signal with a factor −1. After inversion of one of the signals from an input pair, the two signals from a pair of microphones are combined, typically added or summed, by a signal combiner $\mathbf{116}_{1,2}$, resulting in combined signals $\mathbf{117}_{1,2}$. Combining a first signal and an inverted second signal can be understood as subtracting the second signal from the first signal, or as determining a difference between the first signal and second signal. Because the microphones in a microphone pair are positioned equidistant from the loudspeaker driver, the contributions of the loudspeaker driver at the respective microphones are in phase with each other, and are thus cancelled out. Sounds from different sources will typically arrive at the microphones of a microphone pair with a phase difference, and will thus not cancel out by subtracting the signals from each other. This is further explained in more detail with reference to FIG. 2A,B.

The combined signal $\mathbf{117}_2$ from one or more microphone pairs may be phase-shifted 118 with a phase shift $\Delta\varphi$. In the depicted example with two pairs of microphones, one pair may be phase-shifted with a 90° phase shift, for example by applying a Hilbert transform. Phase shifting will be discussed in more detail below with reference to FIG. 7A. Methods to apply arbitrary phase shifts, as may be used in embodiments with other arrangements of microphone pairs, are discussed below with reference to FIG. 7B-D.

The combined, and optionally phase-shifted, signals from the microphone pairs are then again combined by a further signal combiner 120 resulting in a further combined signal 121.

The further combined signal 121 is provided to a signal amplifier 122 for restoring, or at least approximating, the frequency spectrum (or loudness balance) of the input signal representing environmental sounds, i.e. sounds from other sources than directly from the loudspeaker driver 102. The signal amplifier typically comprises components for boosting the low frequencies and for attenuating the high frequencies. For example, the amplifier may comprise one or more high-shelf filters for attenuating the high-frequency signals and/or one or more low-shelf filters for boosting the low-frequency signals.

Preferably, the amplifier attenuates frequencies above a first transition frequency with −3 dB per doubling of the number of microphones, for example, −3 dB for one microphone pair, −6 dB for two microphone pairs, −7.8 dB for three microphone pairs, −9 dB for four microphone pairs, −10 dB for five microphone pairs, −10.8 dB for six microphone pairs, −12 dB for eight microphone pairs, or −13 dB for ten microphone pairs. In general, the attenuation a(f) may be given or approximated by $$a(f) = \log_2 N \times -3 \text{ dB} \tag{4}$$

where N is the number of microphones. The amplifier may comprise a high-shelf filter to implement the attenuation, as is described in more detail below with reference to FIG. 3D.

Preferably, the amplifier boosts frequencies below a second transition frequency with +6 dB per octave. In general, the boost b(f) may be given or approximated by $$b(f) = \frac{f_{t,2}}{f} \times +6 \text{ dB} \tag{5}$$

where $f_{t,2}$ is the second transitions frequency. The amplifier may comprise a plurality of low-shelf filters in series, as is described in more detail below with reference to FIG. 3D.

The first and second transition frequencies can be the same frequency. The first and second transition frequencies typically depend on the distance between the microphones in a microphone pair, on the number of microphones pairs, and on the parameters of the filters. This will be discussed in more detail below with reference to FIG. 3A-C.

The output of the amplifier 122 may be further enhanced by an acoustic module 124. The acoustic module may add sound effects to the input, such as virtual acoustics, reverberation effects, and so on. The acoustic module may also mix the input signal with a signal from an external source, which may be provided by a further sound input 126. The further sound input may be a wired or wireless connection. The signal processor 110 may comprise a further amplifier to amplify the input signal received by the further sound input.

The acoustic module 124 may, for example, process the captured environmental sounds in one of the following ways. The audio signal obtained by the microphones $104_{1-4}$ of the environmental sound loudspeaker 100, optionally combined and amplified, in principle contains all the sounds present in the physical environment surrounding the subject(s). This is particularly relevant when considering methods for adding acoustical properties of a virtual environment to the audio signal. In a typical use scenario, the sound sources captured by the environmental sound loudspeaker are, as such, already perceived by one or more (possibly a great many) users or subjects. These sound sources may be perceived from the discrete location of each subject within the environment, and these sound sources may be perceived as having a shape, dimensionality and other characteristics by which the subject may relate the type of sound source, its location and its directionality in space, among other things.

Thus, the acoustic module 124 does not have to add various effects to the environmental audio signal that are regularly used by other devices to simulate the spatial location and movement of sound sources, such as distance attenuation, distance damping due to air absorption and Doppler shifts, et cetera. Furthermore, the acoustic module does not need to take the individual positions and movements of subjects into account in the virtual acoustic simulation, as each subject will already relate to all other sound sources in the physical environment. This may include the added sounds of a virtual environment and/or additional sound sources inhabiting a virtual environment, played back by one or more loudspeakers at specific locations in the physical environment.

In general, with regards to adding reflections of a sound source in a virtual environment, these may be categorized in the perceptual phases of first reflections (FR) of the incident sound waves from the location of virtual walls and/or objects, early reflections (ER) of the sound waves occurring between the virtual walls and/or objects, and late reflections (LR) which are composed of the sum of many consecutive orders of reflections between the virtual walls and/or objects. This forms a distinct frequency and amplitude envelope of a decaying signal, i.e., the reverberation of the sound in a given virtual environment.

A virtual environment may have a distinct shape, size and material characteristics and may be composed of several walls and/or objects. Reverberation is thus the product of sound waves reflecting off surfaces in such a distinct environment. For example, the interior of a cathedral has a distinctly different shape and dimensions compared to a living room, and this in turn produces distinctly different reflections and results in a different character of reverberation. Surface properties may also be taken into account for accurate simulation of the reflections in a virtual environment. Reflection and reverberation properties are also shaped by the surface's roughness which influences the diffraction, i.e. diffusion or scattering of frequency components in the reflected sound waves. Another aspect determining the type of reflections and reverberation is the hardness of the surfaces, e.g. a surface covered with soft fur is less reflective of sound waves than a marble stone surface. The amount of reflection of incident sound waves from a surface is inversely proportional to the amount of absorption of the sound waves, i.e., the amount of energy dissipating through the surfaces of walls and/or objects in the virtual environment, which results in a reduction of amplitude for particular frequency regions of the incident sound, and thus a reduction of those frequency components in the resulting envelope of the reverberation signal.

In some embodiments, the responses of virtual surfaces and/or objects to incident sound waves and its subsequent reflections, absorption, diffraction and reverberation within a virtual space of distinct shape and size may be represented in the acoustic module 124 as a distinct setting of an artificial reverberation system, for example as described in Dutch patent application NL2026361 by the same applicant, which is hereby incorporated by reference. In other embodiments, such characteristics may be represented in the acoustic module by convolution of the input audio signals with a set of impulse responses (IR) that were recorded prior in real environments of the intended size, shape and material characteristics.

Optionally, further audio input signals may be added as input to the acoustic module 124, for example using further sound input 126, and all audio input signals may be combined to obtain a modified audio signal. The further audio input signals may be other environmental sound signals, e.g., the modified and combined audio signals obtained from a set of omnidirectional microphones integrated in a further environmental sound loudspeaker; and/or other pre-recorded, generated and/or live-obtained sound signals associated with a virtual sound source which are added to enrich the environment.

With regards to adding virtual sound sources to enrich a physical environment, such sound sources may be added in a direct manner, e.g., the audio input signal(s) can be distributed and played back directly to the loudspeaker(s). Additionally or alternatively, the virtual sound sources may be assigned a location in a virtual space, e.g. defined by cartesian coordinates (xyz). In such an embodiment, the loudspeaker(s) may be configured in a loudspeaker configuration and each loudspeaker may similarly be assigned a location in a virtual space, preferably using the same coordinate system. The audio signal components obtained from the audio input signals for each discrete loudspeaker can be attenuated based on the distance and angle of the location of the virtual sound source respective to the location of each loudspeaker. The resulting gain of each audio signal component obtained from each audio input signal for each discrete loudspeaker may be zero for some loudspeakers and/or larger than zero for other loudspeakers. In another embodiment, virtual sound sources may be combined with one or more environmental sound signals and the same acoustical properties of a virtual environment may be added to them, which may comprise methods to generate reflections, diffractions, absorption and/or reverberation of the audio input signal(s) in a virtual environment.

In an embodiment, an environmental sound signal may be used as an audio trigger and/or marker to activate playback of a (portion of) a pre-recorded and/or generated audio signal, optionally marked with a time code to play back the particular portion based on the received audio trigger and/or marker. In another embodiment, real-time obtained data of an environmental sound signal, e.g., the measured intensity of an environmental sound signal or the frequency characteristics of an environmental sound signal, which may be obtained from e.g. a real-time Fast-Fourier Transform (FFT) analysis of the environmental sound signal, may be compared and associated with a pre-recorded audio signal, i.e. an audio watermark. Based on predetermined and/or real-time generated matching features, such real-time obtained information of the environmental sound signal may be used as an audio trigger and/or marker to activate playback of a pre-recorded, generated and/or live-obtained audio input signal associated with a virtual sound source. Such real-time obtained data of an environmental sound signal may also be used to alter and/or modulate in real-time the properties of a pre-recorded, generated and/or live-obtained audio input signal, e.g. the higher the intensity of a particular environmental sound signal, optionally analysed, compared and matched to an audio watermark, the higher the intensity and/or activity of the pre-recorded, generated and/or live-obtained audio input signal, or vice versa. As such, many properties of an audio input signal associated with a virtual sound source may be altered and/or modulated in real-time by data obtained from the environmental sound signal.

Other implementations and/or uses of the acoustic module 124 can also be envisioned without departing from the scope of the invention.

The components of the signal processor 110 can be distributed over one or more hardware components. For example, the amplifier 122 and the acoustic module 124 may be implemented as a (single) microprocessor coupled to a memory storing computer-readable code. In general, the components may be implemented as analogue components, digital components, or a mixture of analogue and digital components.

The signal processor 110 further comprises an output 128 for providing an output signal 129. The output is connected to the loudspeaker driver 102. The connection may be wired or wireless. Thus, the output signals from the microphones 104$_{1-4}$, i.e., the captured environmental sounds, are provided as input signals to the loudspeaker driver, after being processed by the signal processor.

The signal processor 110 further comprises a power source 130 for providing power to components of the signal processor. The components may be implemented as, e.g., an electric circuit board comprising a microprocessor and signal amplifiers. The power source may comprise an integrated power source such as a battery and/or a connector to connect the device to an external power source.

Because microphones from a microphone pair are positioned at equal distance from the loudspeaker driver 102, and signals from the microphones are inverted before being combined, sounds originating from the loudspeaker driver may efficiently be removed from the output that is fed to the loudspeaker driver. Thus, unwanted feedback may be prevented or at least minimised. The amplification ensures that the environmental sounds, i.e., sounds recorded by the microphones that are not coming (directly) from the loudspeaker driver, may be played back with high fidelity. Sounds coming from the loudspeaker driver that have been reflected by an object in the environment, are considered environmental sounds and will typically not be cancelled by the signal processing.

In an embodiment, the acoustic module 124 can be an external sound processor. The signal processor 110 may therefore comprise a WiFi sensor or ethernet connection to connect to an external sound processor or a digital audio network via a wired or wireless ethernet connection, and/or a connector to plug in a line-out audio cable. The signal processor may also comprise a line-in for the loudspeaker input signal to transfer the loudspeaker input signal from an external sound processor to the signal processor. This line-in may comprise a WiFi sensor to transfer wireless from a digital audio network through ethernet and/or a connector to plug in a line-in audio cable.

The environmental sound loudspeaker may comprise a location sensor to determine location information specifying a location of the device. The environmental sound loudspeaker may be configured based on the location information and, optionally, location information of other devices such as other loudspeakers. The location sensor may comprise a WiFi signal-based sensor and/or an ultra-wide band (UWB) frequency based sensor for spatial localization of the device. Alternatively or additionally, absolute position sensors such as GPS sensors may be used.

Figure 2B:
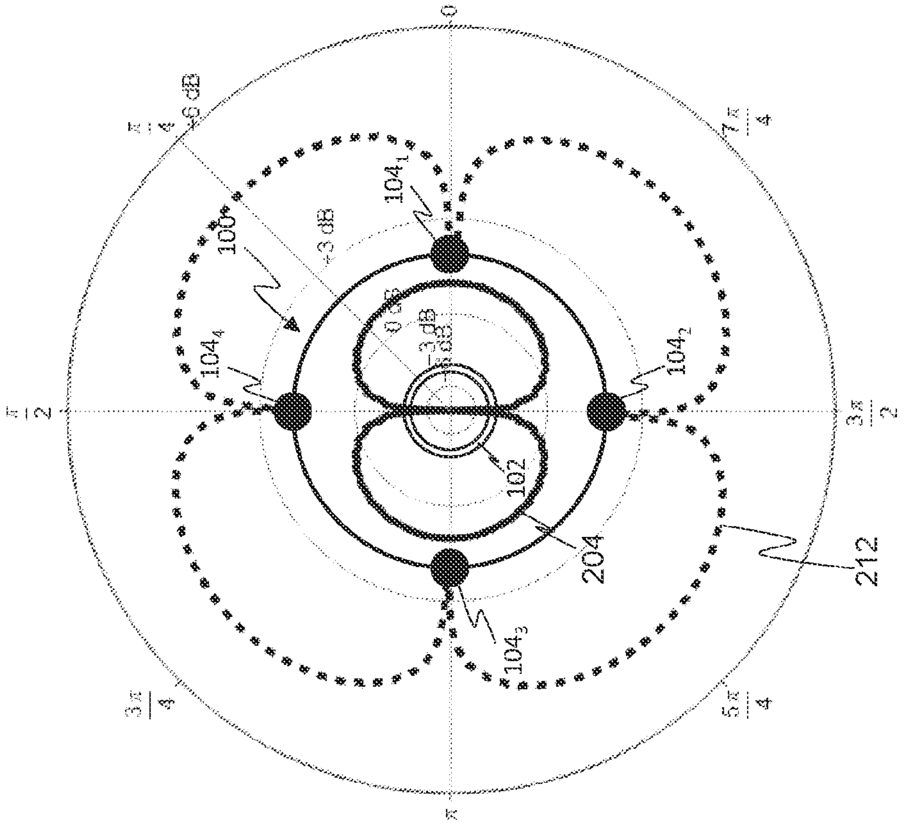
FIGS. 2A and 2B depict the angular sensitivity for an environmental sound loudspeaker with, respectively, one and two microphone pairs.
Figure 2A:
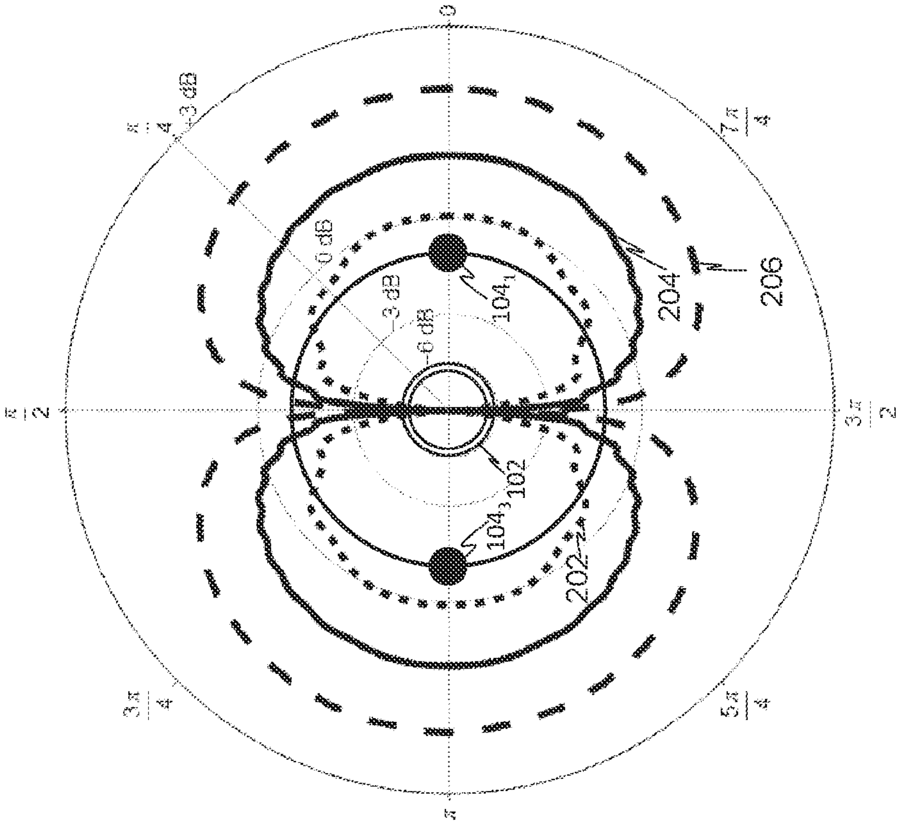

FIG. 2A depicts the angular sensitivity for an environmental sound loudspeaker with one microphone pair. In this example, the microphones are placed on the +/−x-axis ($\varphi$=0°,) 180° at a distance d/2 from the centre of the loudspeaker driver. The dotted line 202 corresponds to the sensitivity pattern with d=5 cm, the solid line 204 to d=15 cm and the dashed line 206 to d=50 cm. The gain is averaged over all frequencies in the audible spectrum, in these plots taken to be 20 Hz-20 KHz. As can be seen, the shape and in particular the average gain of the pattern depends on the distance between the microphones and the frequency range under consideration.

In general the behaviour of long wavelengths is different from that of short wavelengths. If the distance between the microphones is larger, the low-frequency region is decreased and the high-frequency region is increased, and thus the averaged gain will be larger, approaching +3 dB (for a system with one microphone pair) for very large distances d. The frequency-dependency will be discussed in more detail with reference to FIG. 3A.

In this context, long wavelengths, corresponding to low frequencies, may be defined as wavelengths longer than a wavelength corresponding to the second transition frequency, or approximately $\lambda > 2.5\sqrt{N}d$, with N the number of microphones. Similarly, short wavelengths, corresponding to high frequencies, may be defined as wavelengths shorter than a wavelength corresponding to the first transition frequency, i.e., $\lambda < 2$ d. Wavelengths corresponding to a frequency between the first and second transition frequencies may be referred to as intermediate wavelengths. However, as will be discussed in more detail below with reference to FIGS. 3A-C, other definitions are equally possible.

In the depicted case with two microphones, sounds from sources on the +/−y-axis are cancelled, because the signals arrive at the microphones with no phase difference. As the gain pattern is rotationally symmetric around the x-axis, in three dimensions, sounds from all sources on (or near) the yz-plane are not, or not effectively, recorded by the environmental sound loudspeaker. It depends on the application whether or not such a directional gain pattern is considered sufficiently omnidirectional.

Experiments in-situ have shown that the distance between the microphones may be arbitrarily small to arbitrarily large without negatively affecting the feedback sensitivity. This has been tested with varying the distance between two pairs of microphones between 8 mm to 8 m. A limiting condition on the lower side is that the minimum distance d between pairs of opposite microphones must be at least the diameter of the loudspeaker driver. However, there is no theoretical size limit to the diameter of the loudspeaker (coaxial) driver itself. An upper limit for the distance d can in practice be formed by the size of the room in which the environmental sound loudspeaker (system) is positioned, or the position of (large) obstacles in the room.

FIG. 2B depicts the angular sensitivity for an environmental sound loudspeaker with two microphone pairs (hence four microphones), similar to the device depicted in FIG. 1. The microphone pairs are placed orthogonally and a 90° phase shift has been applied to the combined signal of one of the microphone pairs, as discussed above with reference to FIG. 1. Compared to the system with one microphone pair (two microphones), the system with four microphones has a more even gain pattern 212, a larger average gain, and no 'deaf spots' (i.e., a direction where the gain is effectively zero) in the xy-plane, although there is a sensitivity drop along the cardinal axes. However, sources on the +/−z-axis are still cancelled. This can be similarly prevented by placing additional microphones on the +/−z-axis. Such an embodiment will be described in more detail with reference to FIG. 5A.

Figure 3A:
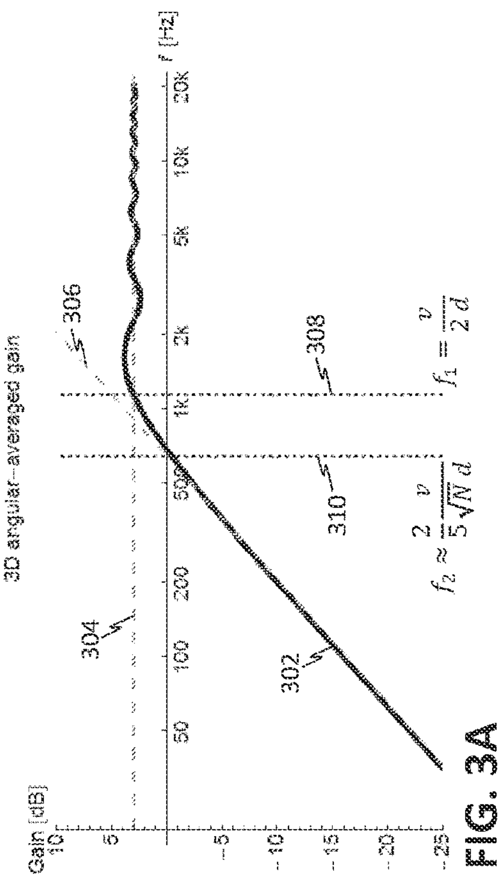
FIG. 3A-D-depict the frequency sensitivity for several environmental sound loudspeakers.

FIG. 3A depicts the frequency sensitivity for an environmental sound loudspeaker with one microphone pair where the distance d between the microphones equals d=15 cm.

The frequency sensitivity 302 has been averaged over all (spatial) angles. The figure shows that due to the inverting and combining of the input signals of the microphone pair, the frequencies higher than a first transition frequency 308 (the 'high frequencies') display an average gain 304 of +3 dB. For the same reason, the frequencies below a second transition frequency 310 (the 'low frequencies') show an attenuation 306 of −6 dB per octave.

Consequently, in order to restore the original loudness balance, i.e., a frequency response that is uniformly zero (representing an output signal that is identical to the input signal), the low frequencies must be boosted by +6 dB per octave, whereas the high frequencies must be attenuated by −3 dB.

In general, there are several possible definitions for the transition frequency or transition frequencies demarcating the low and high frequencies. As depicted here, the second transition frequency 310 may be defined as $$f_{t,2} = 0.4\frac{v}{\sqrt{N}\,d}, \tag{6}$$

where v is the speed of sound and N the number of microphones. The value 2/5 is an approximate value determined based on simulations. This second transition frequency is the frequency where the graph representing the +6 dB boost per octave for the low frequencies intersects the frequency axis. The first transition frequency 308 may be defined as $$f_{t,1} = \frac{v}{2d}, \tag{7}$$

which is the lowest frequency at which the graph representing the spatially averaged frequency-dependent gain first intersects the $+3\log_2(N)$ dB line, with N again the number of microphones. An advantage of the first transition frequency is that it is independent of the number of microphones.

It is noted that restoring the loudness balance may also be obtained by boosting the frequencies below the first transition frequency $f_{t,1}$ by +6 db/octave, and attenuating all frequencies by $-3\log_2(N)$ dB. This way, only the first transition frequency needs to be determined. Additionally such an implementation may simplify the amplifier hardware and/or software.

Figure 3B:
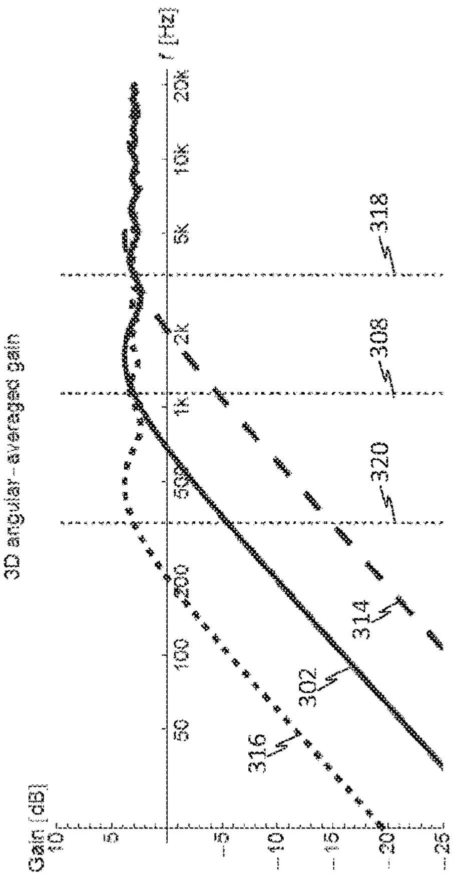

FIG. 3B depicts the frequency sensitivity for an environmental sound loudspeaker with one microphone pair where the distance d between the microphones is varied. The simulated systems were the same as those depicted in FIG. 2A. The dashed line 314 corresponds to the sensitivity for d=5 cm, the solid line 302 to d=15 cm and the dotted line 316 to d=50 cm. Thus, the effect of changing the distance d between the microphones in a pair of microphones is a horizontal translation corresponding to a frequency multiplication by the quotient of the respective distances. Similarly, the first transition frequencies 318,308,320 are shifted by a same factor, i.e., $$f_{t,1}(d_2) = \frac{d_1}{d_2} f_{t,1}(d_1)$$

where $d_1$ and $d_2$ denote the distance between the microphones in a microphone pair in, respectively, a first and a second system; e.g., $$f_{t,1}(d=5\text{ cm})=\frac{15}{5}\times f_{t,1}(d=15\text{ cm})\text{ and }f_{t,1}(d=50\text{ cm})=\frac{15}{50}\times f_{t,1}(d=15\text{ cm}).$$

Figure 3C:
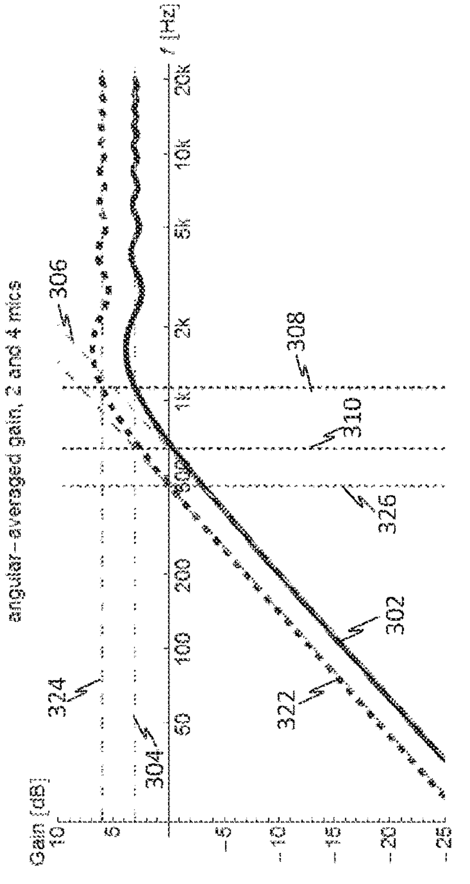

FIG. 3C depicts the frequency sensitivity for environmental sound loudspeakers with one and two microphone pairs. The simulated systems were the same as those depicted in FIGS. 2A (with d=15 cm) and 2B, respectively. The solid line 302 corresponds to a system with one microphone pair (two microphones), and the dotted line 322 corresponds to a system with two microphone pairs (four microphones). It can be seen that the effect of doubling the number of microphone pairs is boosting the signal with +3 dB (a vertical translation of the signal), despite the difference in directional sensitivity shown in FIGS. 2A and 2B. It can be seen that this results in a decrease of the second transition frequency 310,326 by ½ octave (corresponding by dividing the second transition frequency with a factor of $\sqrt{2}$), whereas the first transition frequency 308 is unchanged. In total, the high frequencies are amplified with a gain 324 of +6 dB.

Figure 3D:
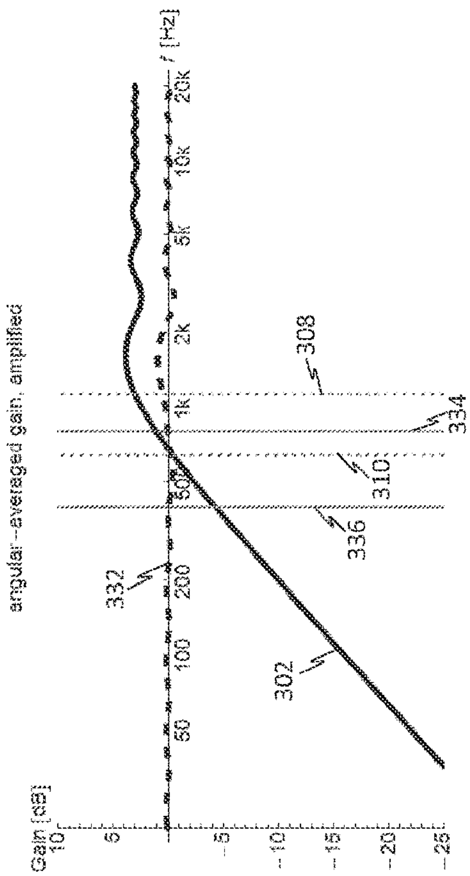

FIG. 3D depicts the effect of an amplifier of an environmental sound loudspeaker on the frequency response. In particular, FIG. 3D depicts a theoretical amplified signal 332 for an environmental sound loudspeaker with two microphones, based on a simulation of an amplifier using mathematically defined filters. The amplifier comprises a series of low-shelf filters and a single high-shelf filter. A series of n low-shelf filters is sometimes known as an $n^{th}$ order low-shelf filter. It can be seen that the gain (relative to the captured environmental sound) of the amplified signal is close to zero for the entire audible frequency range, representing an output signal that reproduces the input signal with high fidelity. In other words, the loudness balance of the output signal of the simulated signal processing system is substantially identical to the captured environmental sounds.

In the depicted embodiment, the series of low-shelf filters $lsf_n$ is defined by a first transfer function $$H_{low,n}(f)=1+\frac{G_0 f_n}{f/(B^Q)+f_n},\tag{8}$$

wherein $G_0$ denotes a gain factor preferably equal to $G_0=1$, B denotes a variable bandwidth preferably defined by $$B=\frac{f_n}{f},$$

Q denotes a Q-factor determining the slope of the gain curve, the Q-factor preferably being equal to Q=5, and wherein $f_n$ denotes a central frequency of the $n^{th}$ low-shelf filter (n=0, 1, . . . ), preferably $f_n$ being determined or approximated by $$f_n=\frac{1}{2^n}\frac{v}{2\sqrt{N}d},\tag{9}$$

wherein v denotes the speed of sound, and wherein N denotes the number of microphones. The first central frequency of the low-shelf filter 336 has been indicated in the figure.

The high-shelf filter hsf is defined by a second transfer function $$H_{high}(f)=(1-G_\infty)+\frac{G_\infty f_h}{f/(B^Q)+f_h},\tag{10}$$

wherein $G_\infty$ denotes a gain factor preferably equal to $$G_\infty=1-\sqrt{\frac{1}{N}},$$

wherein N denotes the number of microphones, B denotes a variable bandwidth preferably defined by $$B=\frac{f_h}{f},$$

Q denotes a Q-factor determining the slope of the gain curve, the Q-factor preferably being equal to Q=5, and wherein $f_h$ denotes a central frequency of the high-shelf filter, preferably $f_h$ being determined or approximated by $$f_h=\frac{v}{2\sqrt{2}d},,\tag{11}$$

wherein v denotes the speed of sound. The central frequency of the high-shelf filter 334 has been indicated in the figure.

The central frequency of a filter is generally lower than the corresponding transition frequency, for example about half an octave lower. This is because the central frequency indicates the centre of the filter, whereas the first and second transition frequencies as defined in this disclosure typically correspond to an upper cut-off frequency of the filter. Because the high-shelf filter may partially overlap the $0^{th}$ low-shelf filter, the low-shelf filter central frequencies $f_n$ may be chosen slightly lower than half an octave below the second transition frequency. Additionally, the gain of the combined signal 302 (i.e., before amplification) starts to deviate from the −6/dB line already for frequencies below the second transition frequency. Consequently, it follows from the simulation that low-shelf filter central frequencies as defined in equation (9) give good results in particular in combination with a high-shelf filter as described above.

To generate the graph depicted in FIG. 3D, one high-shelf filter hsf and a series of six low-shelf filters $lsf_n$, n=0, 1, . . . , 5 as defined above were applied to the amplifier's input signal. In general, the number of low-shelf filters depends on the second transition frequency, and hence on the distance d. The number of low-shelf filters may also depend on the value taken for the lower bound of the audible frequency range. It can be seen that the resulting signal has a gain close to zero, representing a reproduction of the input signal with a high fidelity. When additional microphone pairs are used, the second transition frequency and the gain $G_\infty$ of the high-shelf filter may be adjusted accordingly.

Thus, an output signal may be obtained with almost identical gain as the input signal, with high fidelity of the captured environmental sound signal, i.e. optimised frequency balance in the omnidirectional field, while the risk of destructive and/or audibly disturbing feedback is entirely or at least mostly eliminated. FIG. 4A-D depict the effect of the signal inversion and combination, and the subsequent amplification for actual measurements.

The measurements depicted in FIG. 4A-D the signals were processed by executing the following procedure, which is similar to the one described above with reference to FIG. 3D.

In a first step, the average gain boost for frequencies with a wavelength $\lambda \leq 2d$ of ~+3 dB per doubling of the number of microphones may be accounted for, as the output gain should not exceed the input gain to maintain effective feedback reduction. Therefore, signal attenuation is required, in particular to eliminate feedback of the high-frequencies. This may be achieved by using a high-shelf filter. The high-shelf filter may be defined by the second transfer function as defined above in eq. (10). This corresponds to a −3 dB attenuation per doubling of the number of microphones. As the measurements depicted in FIG. 4A-D were obtained using an environmental sound loudspeaker with four microphones (two microphone pairs), a +6 dB gain boost for the high frequencies was corrected for.

In a second step, the low frequencies may be boosted, for example using a series of n low-shelf filters (an $n^{th}$-order filter). In accordance with the experimental observations and the simulated results, the low-shelf filter may be implemented with the first transfer function defined above in eq. (8). This corresponds to a low-frequency gain boost of ~6 dB (at f=0) while the high-frequency gain (f=∞) is constrained to be 1. After applying the low-shelf filter in a series of $$\left\{f_0 = \frac{v}{2^0 d}, f_1 = \frac{v}{2^1 d}; f_2 = \frac{v}{2^2 d}; \text{etc.}\right\},$$

the equal loudness balance of the low-frequency region is restored in the obtained audio signal after combining all microphones.

If, for example, the microphones are placed relatively close together, a longer series of low-shelf filters (higher-order low-shelf filter) may be required to boost the lowest frequencies. When the microphones are placed relatively far apart, a shorter series of low-shelf filters (lower-order low-shelf filter) may be used. More in general, the second transition frequency $f_{t,2}$ (and hence the central frequencies of the low-shelf filters) moves with the distance d between the microphones. Effectively this means that the low-shelf filter may become obsolete for distances between microphone pairs of d>4 m, as then $$f_1 = \frac{v}{2^1 d} \approx 42.875 \text{ Hz}$$

and the effective boosting of the frequencies starts below the threshold of hearing.

In some embodiments, the second transition frequency may be selected to be identical to the first transition frequency, i.e., $$f_{t,2} = \frac{v}{2d}.$$

In such embodiments, the high-shelf filter may be replaced by a simple multiplier reducing the signal gain with $G_1 = \sqrt{1/2} = -3$ dB for a single microphone pair, or as $G_{mic} = \sqrt{1/N} = -3 \log_2 N$dB for N microphones.

Furthermore, if a plurality of loudspeakers are configured to receive and playback the environmental sound obtained from one or more pairs of microphones integrated in (or coupled to) an environmental sound loudspeaker, as discussed in more detail below with reference to FIG. 10, then the amplifier of the microphone signals may be further reduced by $G_{sp} = \sqrt{1/N_{speaker}}$ where $N_{speaker}$ denotes the number of speakers The gain reduction of the combined signals may also be adjusted based on the inter-microphone distance d. In an embodiment where the microphones are not integrated in the same physical device as the loudspeaker driver, but are placed in an environment equidistant and symmetrically spaced around the loudspeaker driver, then for the effective distance of the microphone to the loudspeaker driver r=d/2, i.e. half the distance between two microphones, the sound pressure at the microphone decreases in inverse proportion to the distance, that is, with 1/r from the measuring point to the sound source. Consequently, doubling of the distance decreases the sound pressure to a half of its initial value.

Therefore, an additional parameter $$G_r = \frac{1}{r}$$

may be introduced for gain correction of the multiplier as a function of the distance between the microphones and the loudspeaker. Thus, the attenuation may become obsolete for distance between a microphone pair of d>4 m when using one loudspeaker and two microphone pairs, as the sum result of the attenuation would amount to 0 dB.

The combined attenuation a in −dB of all contributions discussed above, in so far as they are applicable to a system under consideration, as well as any optional further contributions, may be given by $$a(-\text{dB}) = \sum_{i \in I} 20 \log\left(\frac{G_i}{G_{ref}}\right) \tag{12}$$

where $G_{ref}=1$ is the reference gain, and i is an index through the set I={mic, sp, r, . . . } of potential gain sources.

FIG. 4A-D depict experimental data of the frequency response of various signals recorded and/or processed by an environmental sound loudspeaker. These figures were generated using an environmental sound loudspeaker similar to the environmental sound loudspeaker 100 depicted in FIG. 1. The environmental sound loudspeaker had two pairs of microphones with a distance d=16 cm between the microphones of a microphone pair. This results in a first transition frequency of approximately 1072 Hz. The second transition frequency was taken to be identical to the first transition frequency, that is, all frequencies below the first transition frequency were boosted. A series of five low-shelf filters was used to boost frequencies in the range 33-1072 Hz (five octaves below the first transition frequency) with +6 db/octave, and the entire resulting signal was attenuated by −6 dB.

Figure 4A:
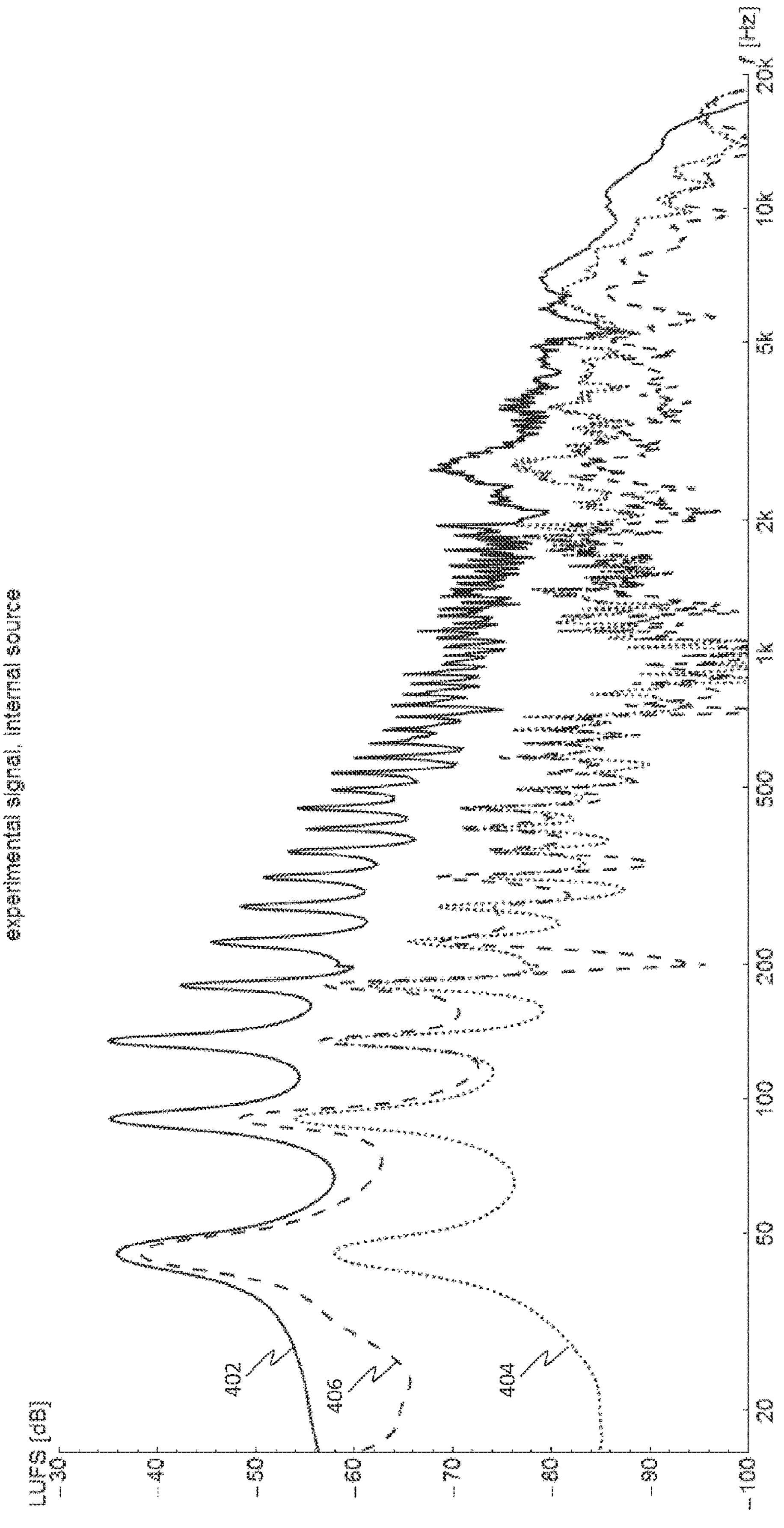
FIG. 4A-D depict experimental data of the frequency response of various signals recorded and/or processed by an environmental sound loudspeaker.

FIG. 4A shows the sound recorded by one of the microphones of the environmental sound loudspeaker while the loudspeaker driver 102 of the environmental sound loudspeaker 100 played an sawtooth wave with a fundamental frequency at 45 Hz provided via external input 126. The loudspeaker driver also played back in real-time the processed sound signal captured by the microphones $104_{1-4}$ of the environmental sound loudspeaker. The graph shows signal intensities in Loudness Units Full Scale (LUFS) as a function of signal frequency. The graph has been smoothed with a sliding averaging window to improve legibility.

The solid line 402 represents an unprocessed microphone input signal $113_1$ of a microphone $104_1$, integrated in the environmental sound loudspeaker. The dotted line 404 represents a first combined (summed) signal $117_1$ of a single microphone pair, where the input signal from one microphone has been inverted $115_1$, corresponding to a phase shift over a 180° phase angle. On average, the amplitude of low frequencies λ>2 d) is reduced by −24 dB whereas the amplitude of high frequencies (λ<2 d) is reduced by −6 dB.

Although the first combined signal $117_1$ has a much lower amplitude than the first input signal $113_1$, the first combined signal is not completely zero, because the signal also comprises components that are reflected in the room in which the environmental sound loudspeaker was placed. These arrive at the microphones of a microphone pair with different phases, and are therefore not annulled by the combination of the first input signal with the inverted second input signal $115_1$.

The dashed line 406 represents a combined and amplified signal 123 of two microphone pairs. A second combined signal $117_2$ of the second microphone pair has been phase-shifted over a 90° phase angle, resulting in a phase-shifted signal 119. The first combined signal and the phase-shifted signal have been combined (summed), resulting in a third combined signal. The third combined signal 121 was amplified by an amplifier 122, amplifying low frequencies by a series of five low-shelf filter and attenuating the signal −3 dB per doubling of the number of microphones, or −6 dB in total for the four microphones. Consequently, the amplifier increases the amplitude of the low frequencies (frequencies corresponding to wavelengths λ>2d) with +6 dB per octave and reduces the high frequencies (frequencies corresponding to wavelengths λ<2d) with −6 dB.

It can be seen that the environmental sound loudspeaker effectively cancels most of the sound coming from the loudspeaker itself. The remaining frequencies that are not zero may be attributed to reflections from the loudspeaker in the environment (−24 dB) that the environmental sound loudspeaker does not cancel out.

Figure 4B:
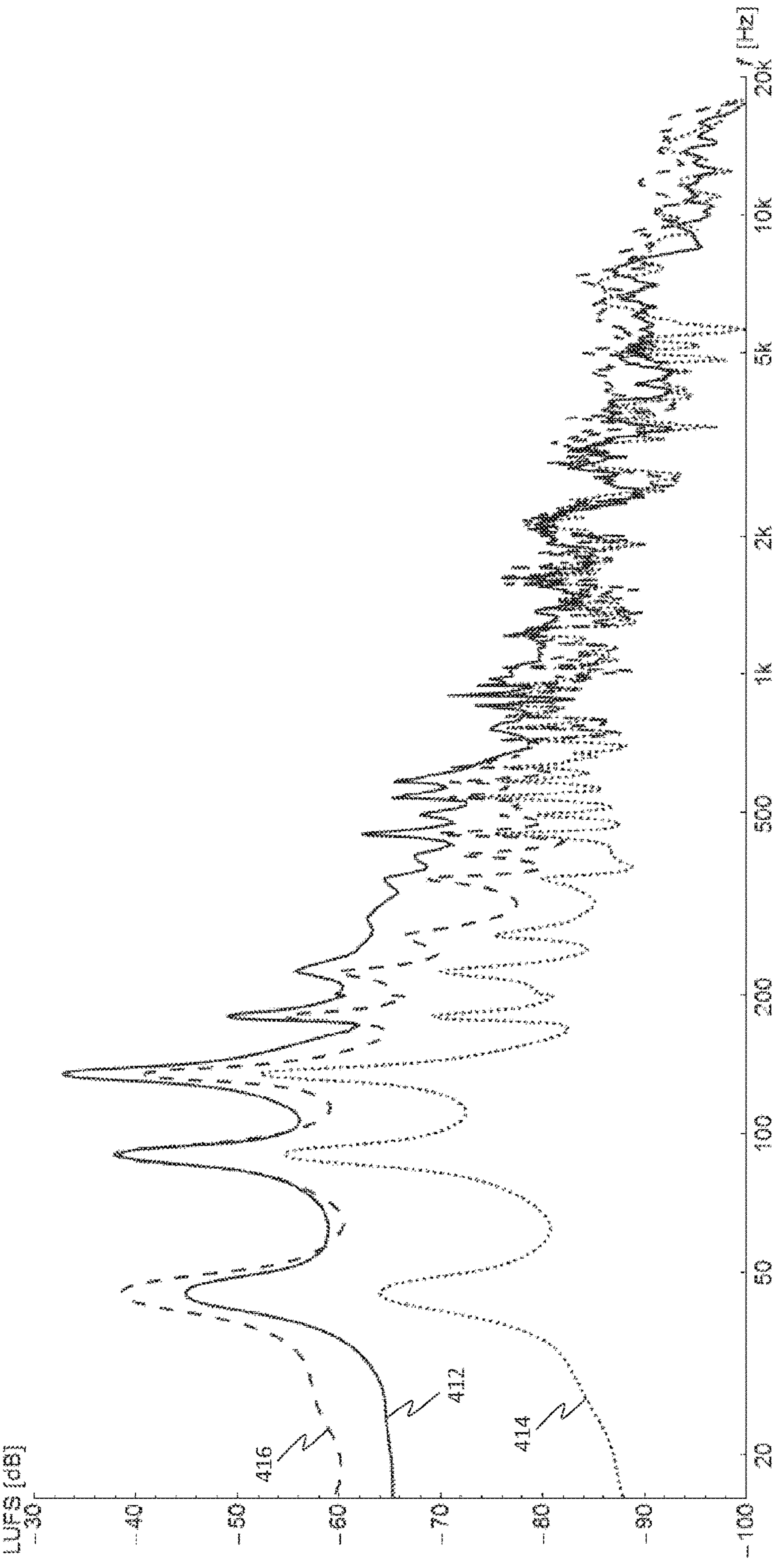

FIG. 4B depicts the same signals as FIG. 4A, but now for a sound coming from an external loudspeaker driver positioned at circa 2 m from the environmental loudspeaker driver. Thus, FIG. 4B shows the sound recorded by one of the microphones $104_{1-4}$ of the environmental sound loudspeaker 100 while an external loudspeaker driver played an sawtooth wave with a fundamental frequency at 45 Hz. The graph show signal intensities in Loudness Units Full Scale (LUFS) as a function of signal frequency. The graph has been smoothed with a sliding averaging window to improve legibility.

The solid line 412 represents an unprocessed microphone input signal $113_1$ of a microphone $104_1$, integrated in the environmental sound loudspeaker. The dotted line 414 represents a first combined (summed) signal $117_1$ of a single microphone pair, where the input signal from one microphone has been inverted $115_1$, corresponding to a phase shift over a 180° phase angle. On average, the amplitude of low frequencies (λ>2d) is reduced by −18 dB whereas the amplitude of high frequencies (λ<2d) is increased by up to +6 dB.

As predicted, the low frequencies of the first combined signal $117_1$ have a much lower amplitude than the first input signal $113_1$, whereas the high frequencies of the inverted and combined signal are often louder than the first input signal.

The dashed line 416 represents a combined and amplified signal 123 of two microphone pairs. A second combined signal $117_2$ of the second microphone pair has been phase-shifted over a 90° phase angle, resulting in a phase-shifted signal 119. The first combined signal and the phase-shifted signal have been combined (summed), resulting in a third combined signal. The third combined signal 121 was amplified by an amplifier 122, amplifying low frequencies by a series of five low-shelf filters and attenuating the signal −3 dB per doubling of the number of microphones, or −6 dB in total for four microphones. Consequently, the amplifier increases the amplitude of the low frequencies (frequencies corresponding to wavelengths λ>2d) with +6 dB per octave and reduces the high frequencies (frequencies corresponding to wavelengths λ<2d) with −6 dB.

Figure 4C:
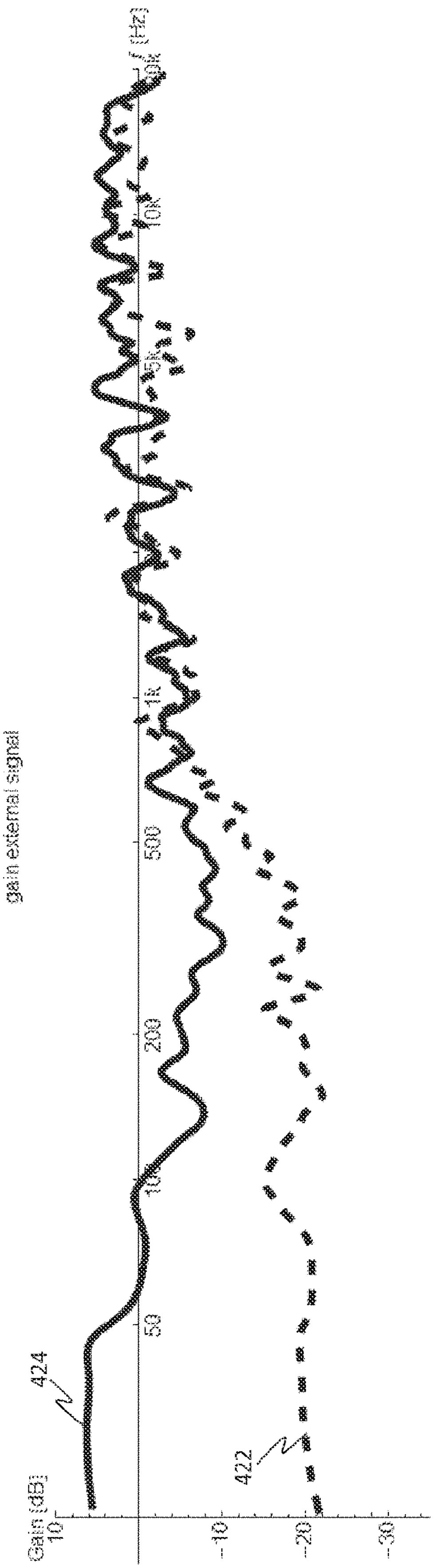

In FIG. 4C, the dashed line 422 depicts the relative gain of the first combined signal $117_1$ and the solid line 424 depicts the relative gain of the amplified signal 123, compared to the first microphone input signal $113_1$ for the measurements with the external sound source depicted in FIG. 4B. It can be clearly seen that the low frequencies are attenuated much more than the high frequencies.

Figure 4D:
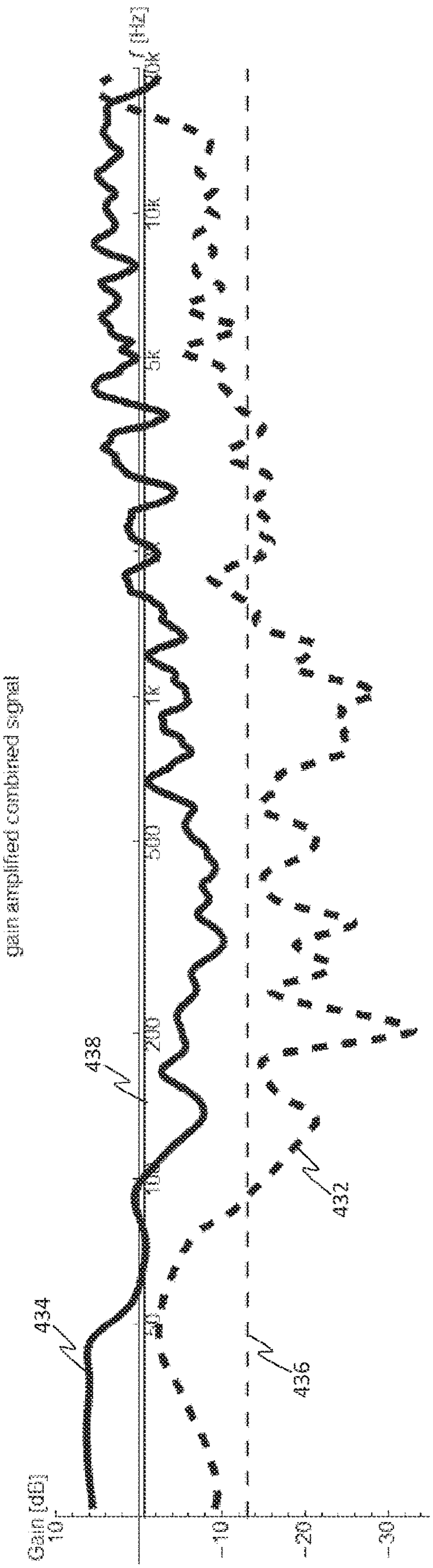

FIG. 4D depicts the relative gain of the amplified signal 123, compared to the first microphone input signal $113_1$. The dashed line 432 represents the measurements with the internal sound source as depicted in FIG. 4A, and the solid line 434 represents the measurements with the external sound source as depicted in FIG. 4B. Averaged over all frequencies, the signal from the internal sound source 436 is attenuated by about −13 dB, whereas the signal from the external sound source is hardly attenuated, with an average 438 of −0.7 dB. Thus, the loudness balance for the external signal is restored by the amplifier, providing a high-fidelity signal at a high playback gain, while the signal components sensitive to produce feedback, i.e., those generated by the loudspeaker driver 102, are effectively eliminated.

Figure 5A:
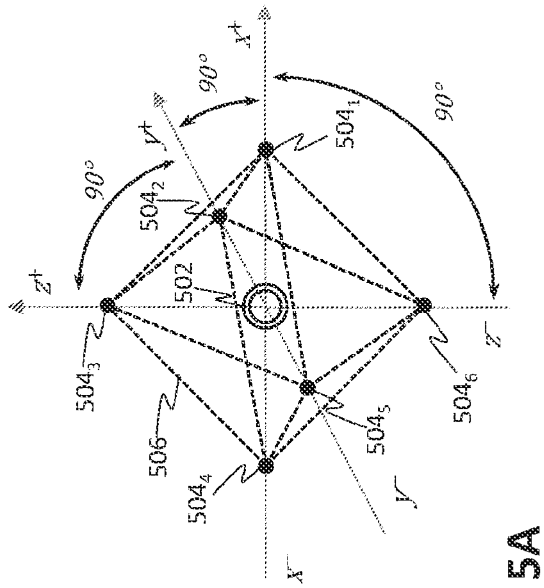
FIG. 5A-D depict embodiments of an environmental sound loudspeaker with, respectively, 3 and 4 microphone pairs in three dimensions.
Figure 5B:
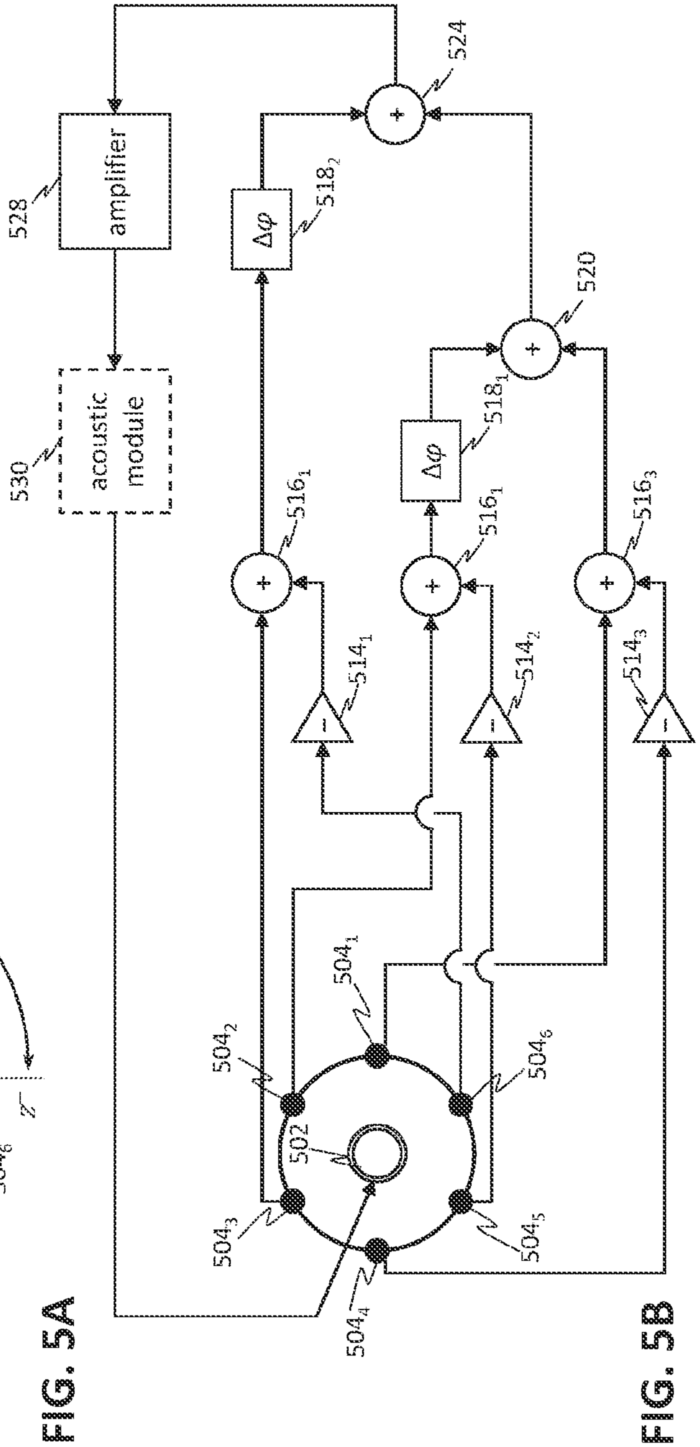

FIG. 5A-D depict embodiments of an environmental sound loudspeaker with, respectively, 3 and 4 microphone pairs in three dimensions. FIGS. 5A and 5B depict an embodiment in which three pairs of microphones $504_{1,4}$, $504_{2,5}$, and $504_{3,6}$ are positioned on the cardinal axes of a cartesian coordinate system with its origin at the centre of the loudspeaker driver. The microphones are positioned at a distance +/−d/2 from the origin. Such a configuration may alternatively be considered as positioning the microphones on the vertices of an octahedron 506. An angle θ may be determined between two adjacent axes which gives θ=90°.

In this case all axes are adjacent to each other, i.e., each microphone neighbours a microphone from each other pair of microphones. Consequently, the signals of the first, second, and third pairs of opposite microphones may be combined (added) $516_{1-3}$ into, respectively, first, second and third combined signals after inverting $514_{1-3}$ one of the each pair of signals, i.e., after applying a phase shift of Δφ=180° to one of the signals of each microphone pair. Subsequently, the first and/or second combined signals may be phase-shifted $518_1$ such that the first and second combined signals have a mutual phase difference of Δφ=90°, after which they may be combined (added) 520 into a fourth combined signal. Then, the fourth combined signal and/or the third combined signal may be phase shifted $518_2$ to obtain a mutual phase difference of Δφ=90°, and both signals may again be combined 524 into a fifth combined signal. The fifth combined signal may then be provided as input to the amplifier.

For embodiments with more (pairs of) microphones (N>6) distributed in three dimensions around the loudspeaker driver, other regular polyhedra, such as the platonic solids may be used. The microphones may be positioned at the vertices of a virtual regular polyhedron.

Figure 5C:
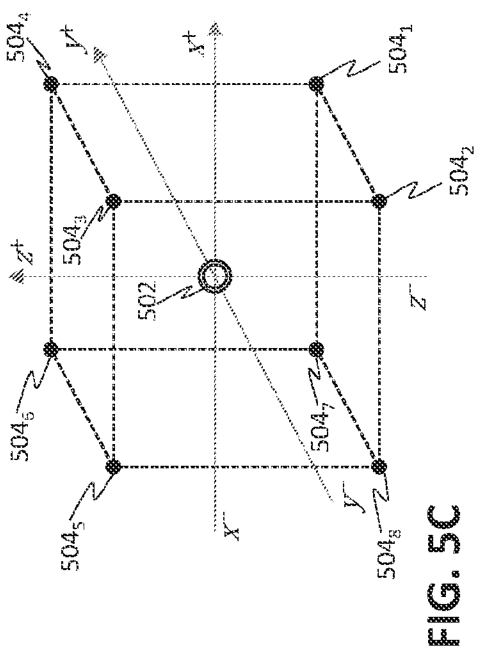
Figure 5D:
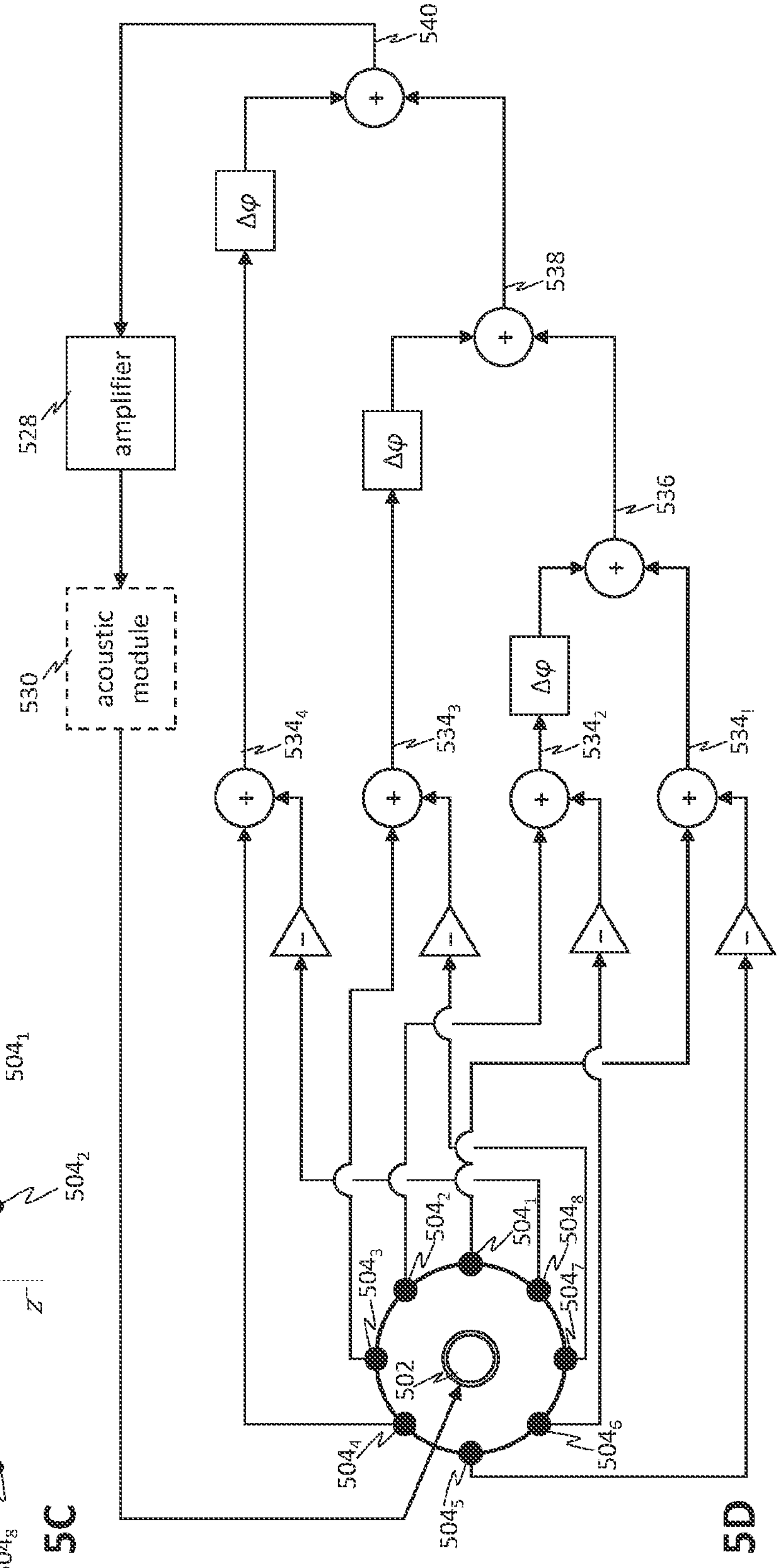

As an example, FIGS. 5C and 5D depict an embodiment in which four pairs of microphones $\mathbf{504}_{1,5}$, $\mathbf{504}_{2,6}$, $\mathbf{504}_{3,7}$, and $\mathbf{504}_{4,8}$ positioned at the vertices of a virtual cube. This positioning gives angles on a plane between adjacent axes of $\theta \approx 71°$. In this case, all axes are adjacent to each other. Thus, for each pair of opposite microphones, one signal may be inverted (phase shifted with $\Delta\varphi = 180°$) and then combined with the other signal from the pair of microphones (effectively subtracting the signals from each other), resulting in four combined signals $\mathbf{534}_{1-4}$. The combined signals are consecutively combined in pairs, where at least one of the combined signals is phase shifted such that the signals to be combined have a phase difference $\Delta\varphi \approx 71°$. In the depicted example, the first and second combined signals $\mathbf{534}_{1,2}$ are combined, resulting in a fifth combined signal 536; the fifth combined signal 536 and/or the third combined signal $\mathbf{534}_3$ are then phase shifted to obtain a phase difference $\Delta\varphi \approx 71°$, after which the signals are combined, resulting in a sixth combined signal 538; and the sixth combined signal 538 is combined with the fourth combined signal $\mathbf{534}_4$, resulting in a seventh combined signal 540. However, other options are also possible; for example, the fifth combined signal could alternatively be created by phase shifting and combining the third and fourth combined signals.

The seventh combined signal is provided as input to the amplifier. The remaining components may be as discussed above with reference to FIG. 1.

Figure 6A:
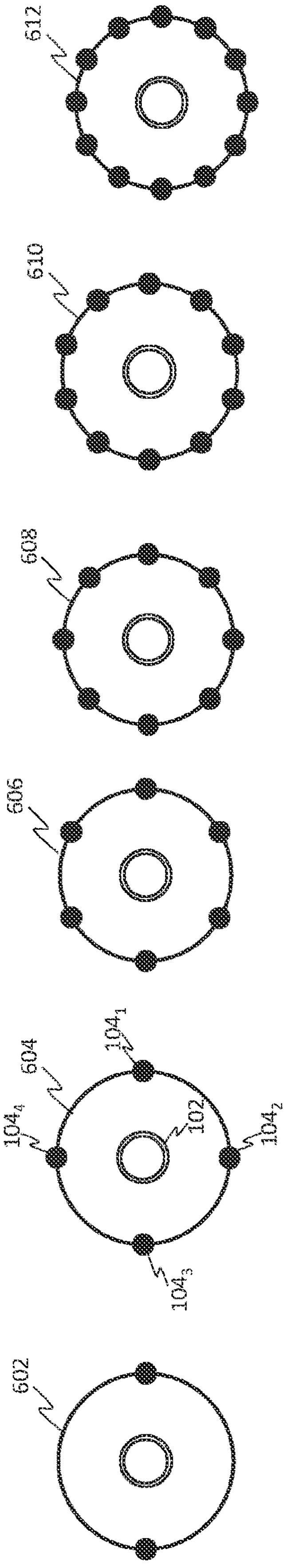
FIGS. 6A and 6B depict embodiments of environmental sound loudspeakers with varying numbers of microphone pairs arranged in two, respectively three, dimensions.

FIG. 6A depicts embodiments of an environmental sound loudspeaker with varying numbers of microphone pairs arranged in two dimensions. In particular, FIG. 6A depicts environmental sound loudspeakers 602-612 with, respectively, 1-6 pairs of microphones (or 2-12 microphones in total). The microphones are equidistantly arranged on a circle with its centre coinciding with the centre of the loudspeaker driver. Thus, the angle between two adjacent microphones is $\theta = 360°/N$ (or $2\pi/N$ radians), with N the number of microphones. The phase shift applied to the microphone signal should equal the angular position of the microphone. For example, with 1 microphone pair, the microphones may be positioned at 0° and 180°; with 2 pairs, at 0°, 90°, 180°, and 270°; with 3 pairs, at 0°, 60°, 120°, 180°, 240°, and 300°; with 4 pairs, at 0°, 45°, 90°, 135°, 180°, 225°, 270°, and 315°; with 5 pairs at integer multiples of 36°; and with 6 pairs at integer multiples of 30°.

Thus, as the phase shift may vary for any angle between two microphone pairs, any amount of microphone pairs positioned at opposite ends of an axis crossing the centre of the circular loudspeaker driver may be configured as $\theta = 360°/N$ (or $2\pi/N$ radians) to obtain a more or less equal pattern for the frequency sensitivity in the omnidirectional field. The subdivision preferably satisfies the condition that the axes of adjacent microphone pairs are at identical angles to each other and their positions are equidistant around the loudspeaker driver's centre.

Figure 6B:
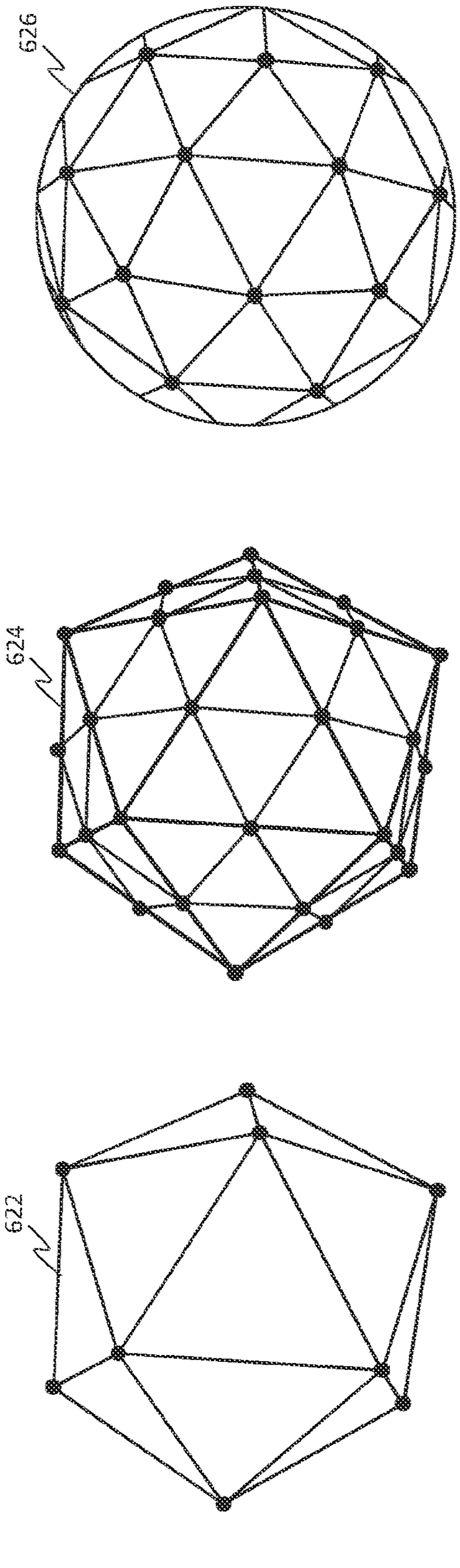

FIG. 6B depicts embodiments of an environmental sound loudspeaker with varying numbers of microphone pairs arranged in three dimensions. The microphones should be arranged symmetrically around the loudspeaker driver. Preferably, the microphones are arranged at the vertices of a virtual platonic solid, e.g., an icosahedron 622 for N=12 microphones, or a dodecahedron for N=20 microphones.

For larger numbers of microphones (N>20), a geodesic polyhedron 626 may be formed by subdividing an icosahedron 624 into triangular faces and projecting all obtained vertices on a sphere. The new faces on the sphere are not equilateral triangles but they are approximately equal edge length. As such, a class I geodesic polyhedron with a frequency of (2,0) (depicted) would provide a solution for a microphone configuration with N=42, and one with a frequency of (3,0) would provide a configuration with N=92. For such configurations, a consistent angle $\theta$ may be obtained that is equal for all adjacent axes between two diametrically opposite vertices of the geodesic polyhedron crossing the centre of the polyhedron, and a consistent phase-shift $\Delta\varphi = 0$ may be applied when combining each subsequent microphone pair associated with an axis.

Although embodiments with large numbers of microphones are possible and may obtain a good omnidirectional sensitivity even with non-omnidirectional microphones, and may be useful in particular in embodiments with a larger number of loudspeaker drivers, embodiments with N≤8 microphones (four or less microphone pairs) are preferred. It has been found that embodiments with N≤8 microphones strike a good balance of cost (due to e.g. components and signal processing) and sensitivity pattern. Simulations show little to no qualitative improvement of frequency sensitivity in the omnidirectional field above N=6 microphones in either a 2D or 3D implementation. As such, embodiments with N=6 microphones (three microphone pairs) are especially preferred.

Figure 7A:
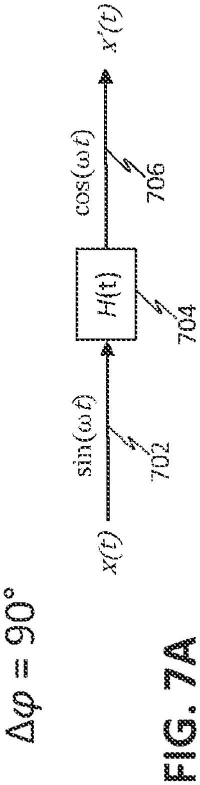
FIGS. 7A and 7B depict phase-shifting components of a signal processor for use in an environmental sound loudspeaker and FIGS. 7C and 7D depict an exemplary phase shift obtained with a phase-shifting component of a signal processor for use in an environmental sound loudspeaker.
Figure 7B:
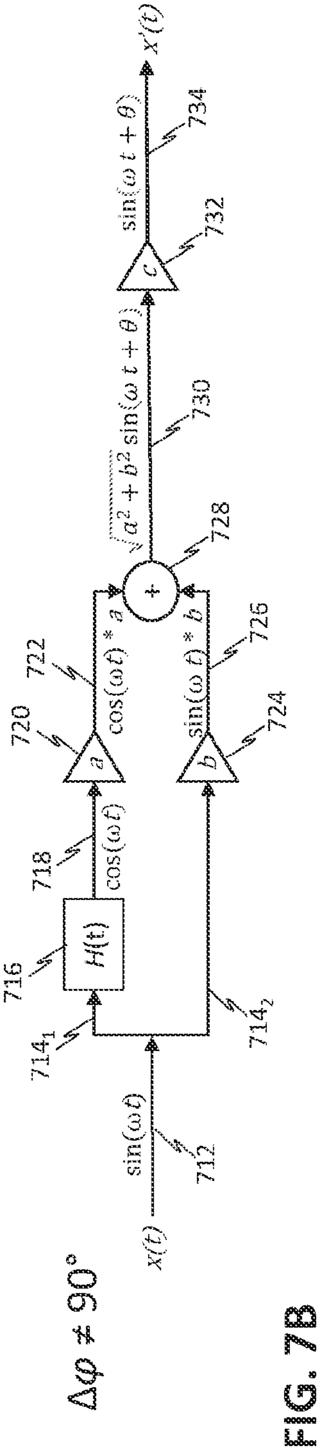

FIGS. 7A and 7B depict phase-shifting components of a signal processor for use in an environmental sound loudspeaker. In particular, FIG. 7A depicts a method to apply a 90° degree phase shift to an acoustic signal, and FIG. 7B depicts a method to obtain an arbitrary phase shift to the acoustic signal. A component for applying an arbitrary phase shift may be used advantageously in environmental sound loudspeaker embodiments comprising more than two microphone pairs in two dimensions, or more than three microphone pairs in three dimensions, because in such embodiments phase shifts of angles other than 180° or 90° may be used.

The applied phase shift $\Delta\varphi$ should preferably be frequency-independent, that is, the phase shift should be equal or at least approximately equal for all frequencies within a given frequency range. Typically, the frequency range may be set as the audible hearing range of, e.g., 16 Hz-20 KHz. A (constant) phase shift in the frequency domain corresponds to a (frequency-dependent) time shift in the time domain. Consequently, the corresponding time difference $\Delta t$ may vary between multiple frequencies in the frequency range.

As depicted in FIG. 7A, a Hilbert transform may be used to apply a phase shift $\Delta\varphi = 90°$ of all frequency components of an audio signal. In general, an input audio signal 702 may comprise one or more components $\sin(\omega t)$ with $\omega = 2\pi f$ the angular frequency. The transfer function y(t) may be defined as the Hilbert transform 704 of x(t) by the integral equation $$y(t) = \int_{-\infty}^{\infty} H(t')\, x(t - t')\, dt'$$

where H(t) is the impulse response of a hypothetical filter. It follows that taking the Hilbert transform of the signal is equivalent to passing it through a filter whose impulse response is $$H(t) = \frac{1}{\pi}\frac{1}{t}.$$

Thus the Hilbert transform is a linear operator given by convolution with the function 1/(πt). In the frequency domain, this operation imparts a phase shift of 90° (π/2 radians) to every frequency component of a function, wherein the sign of the shift depends on the sign of the frequency. Consequently, the output audio signal 706 is phase-shifted over 90° compared to the input signal and comprises one or more components sin(ωt+90°)=cos(ωt). Various methods to implement a Hilbert transform are known in the art.

As depicted in FIG. 7B, an arbitrary frequency-independent phase shift Δφ=θ may be achieved by the following procedure. A first copy $\mathbf{714}_1$ of an input audio signal 712 is provided to the input of a Hilbert filter 716 providing a first output signal 718. As described above, a Hilbert transform results in a frequency-independent phase shift of 90°. The transformed (phase-shifted) signal is amplified 720 with a first amplification factor a, resulting in a first amplified signal 722.

A second copy $\mathbf{714}_2$ of the first input signal 712 is amplified 724 by a second amplification factor b, resulting in a second amplified signal 726. The factors a and b are selected such that $$\theta = \arctan\frac{a}{b}$$

or equivalently, $$\frac{a}{b} = \tan\,\theta,$$

where θ is the desired phase shift.

The first amplified signal 722 and the second amplified signal 726 are combined 728, resulting in a combined signal 730. Compared to the input signal 712, the combined signal is phase-shifted with a phase shift Δφ=θ and amplified by a factor $\sqrt{a^2+b^2}$. The combined signal may be amplified 732 with a third amplification factor $c=1/\sqrt{a^2+b^2}$, resulting in a phase-shifted output signal 734. In general, the factors a, b, and c may be chosen such that at least one of those equals +/−1. In that case, the corresponding amplifier may be left out or may be implemented as an inverter, as the case may be.

In brief, in this method, two copies of an input signal are processed such that the copies obtain a Δφ=90° phase difference, for example by applying a Hilbert transform as described above with reference to FIG. 7A to one of the copies. The two copies are then combined in an additive mixer resulting in a linear combination of the two (modified) copies with respective weights a and b. The resulting phase difference Δφ=θ between the two signals may be determined as follows:

$$b\,\sin(\omega\,t) + a\,\cos(\omega\,t) = \sqrt{a^2+b^2}\,\sin(\omega\,t+\theta),\ \theta = \arctan\frac{a}{b}$$

It follows that the phase shift Δφ is equal for every frequency f, whereas the time shift Δt may vary per frequency. The gain of the 90° phase-shifted signals combined in the additive mixer may be determined by:

$$\tan\,\theta = \frac{G_a}{G_b},\ G_a\begin{cases} = 1 \text{ if } G_b < 1 \\ \leq 1 \text{ if } G_b = 1 \end{cases}$$

for phase shifts of 0°≤θ<90°.

The resulting attenuation a in −dB may be defined as $$a(-\text{dB}) = 20\log\left(\frac{G}{G_{ref}}\right)$$

where $G_{ref}=1$ is the reference gain.

To obtain a phase shift with angles θ>90°, the signs of a and b are shifted as:

$$\theta = 90° - 180°\text{: } \{a+ : b-\}$$

$$\theta = 180° - 270°\text{: } \{a- : b-\}$$

$$\theta = 270° - 360°\text{: } \{a- : b+\}$$

where the respective component comprises an inverting amplifier on the signal if the sign is negative.

The gain of the third amplification factor c comprises an attenuation operation applied to the final output signal to compensate for the varying amplitude resulting from the summation of the two phase-shifted signals, so that the output gain is always identical to the input gain. This results in a phase-shift and all-pass filter for all frequencies within the set frequency range (e.g., 16 Hz-20 kHz).

The gain G may be determined as c $$G_c \text{ for } c = \cos(\theta),\ \theta = 0° - 45°,\ 135° - 225°,\ 315° - 360°$$

$$G_c \text{ for } c = \cos(90° - \theta),\ \theta = 45° - 135°,\ 225° - 315°$$

In general, a phase shift is applied to a signal in order to be added to a non-phase-shifted signal. In some embodiments, instead of phase-shifting one signal by Δφ=0, both signals may be phase shifted provided a mutual phase-difference θ is obtained. For instance, each signal may be phase-shifted by half the amount, i.e., a phase shift Δφ=+θ/2 may be applied to the one signal and a phase shift Δφ=−θ/2 may be applied to the other signal.

An alternative method to apply an arbitrary (relative) phase shift is provided below. This method uses a combination of all-pass filters with a general frequency-dependent phase shift $$\theta(\omega) = -4\,\arctan\left[\left(\frac{\omega}{\omega_0}\right)^{Q}\right],$$

where $\omega_0$ is known as the corner frequency or central frequency and Q is a quality factor. The all-pass filter may be implemented as a digital filter or as an analogue filter, e.g. an op-amp-based all-pass filter (where typically $$\omega_0 = \frac{1}{RC}).$$

An almost constant, frequency-independent phase shift over a frequency range of interest ($\omega_{min}$, $\omega_{max}$) may be obtained by using the difference between two (series of) all-pass filters.

In general, the combined function may have the following form:

$$\theta(\omega) = -4\left(\sum_{i=1}^{n} \arctan\left[\left(\frac{\omega}{\omega_{0,A}(i)}\right)^{Q_A(i)}\right] - \sum_{i=1}^{n} \arctan\left[\left(\frac{\omega}{\omega_{0,B}(i)}\right)^{Q_B(i)}\right]\right)$$

Other embodiments may have a different pre-factor than −2, e.g., −2. Some embodiments may furthermore comprise an overall shift. For example, opamp-based all-pass filters may have $$\theta(\omega) = -2 \arctan\left[\left(\frac{\omega}{\omega_0}\right)^Q\right] \text{ or } \theta(\omega) = \pi - 2 \arctan\left[\left(\frac{\omega}{\omega_0}\right)^Q\right].$$

In general, a more constant phase shift may be obtained by using a larger amount of terms (i.e., n>1). An optimal choice of parameters may be found using known optimisation functions, for example by minimising $$\chi^2 = \int_{\omega_{min}}^{\omega_{max}} \left(\frac{\theta(\omega) - \theta_{target}}{\theta_{target}}\right)^2 d\omega$$

or a similar function, e.g., using a different weight for ω.

In order to reduce the parameter space, additional constraints may be applied. For example, the corner frequencies $\omega_{0,A}$ (i) and $\omega_{0,B}$(i) may be chosen (substantially) equally spread over and/or around the frequency range of interest. The ratio of the central frequencies of corresponding terms may be substantially constant, i.e., $$\frac{\omega_{0,A}(i)}{\omega_{0,B}(i)} = r$$

for all i. The quality factors of corresponding terms may be substantially equal, i.e., $Q_A$(i)=$Q_B$(i) for all i, or even equal for all terms, i.e., $Q_A$(i)=$Q_B$(i)=Q for all i. Furthermore, the search space may be limited based on practical considerations; e.g., very high or low corner frequencies may be less practical to implement.

Figure 7C:
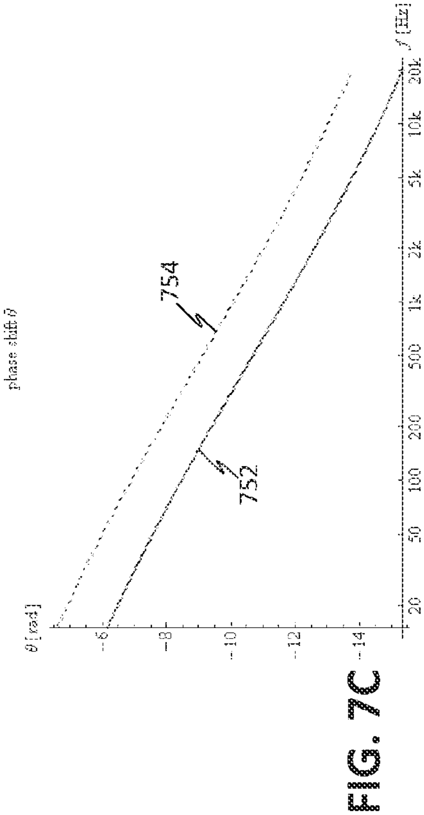
Figure 7D:
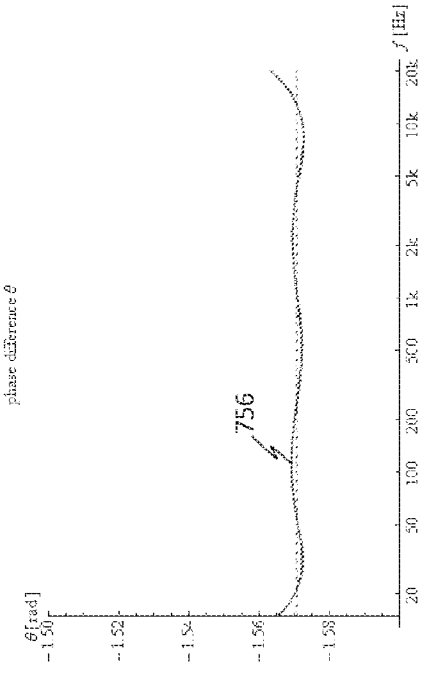

FIGS. 7C and 7D depict an exemplary phase shift obtained with a phase-shifting component of a signal processor for use in an environmental sound loudspeaker. In particular, FIG. 7C depicts frequency-dependent phase shifts of two all-pass filters. Curve 752 depicts the a phase shift $\theta_A$ and curve 754 depicts a phase shift $\theta_B$, where $\theta_A$ and $\theta_B$ are given by $$\theta_X(\omega) = -4\sum_{i=1}^{n} \arctan\left[\left(\frac{\omega}{\omega_{0,X}(i)}\right)^{Q_X(i)}\right]$$

with n=3, and X={A, B}. The parameters have been optimised to obtain a −π/2 phase shift using the difference $\theta_A$−$\theta_B$, and are, in this example, given in Table 1. The parameters have been optimised to obtain a substantially constant phase shift over the interval ($\omega_{min}$, $\omega_{max}$)=(15 Hz, 20 kHz).

FIG. 7D depicts the resulting phase shift 754 by taking the difference $\theta_A$−$\theta_B$. The phase difference over the frequency range of interest is about 0.01 rad.

TABLE 1

Optimised parameter values for a phase shift $\theta_A - \theta_B = -\pi/2$

| | $\omega_{0,X}(1)$ | $\omega_{0,X}(2)$ | $\omega_{0,X}(3)$ | $Q_X(1)$ | $Q_X(2)$ | $Q_X(3)$ |
|---|---|---|---|---|---|---|
| X = A | 1.67993 | 243.2 | 6943.5 | 0.277988 | 0.367248 | 0.342158 |
| X = B | 28.5636 | 842.76 | 19944.1 | 0.294613 | 0.32929 | 0.223622 |

Figure 8:
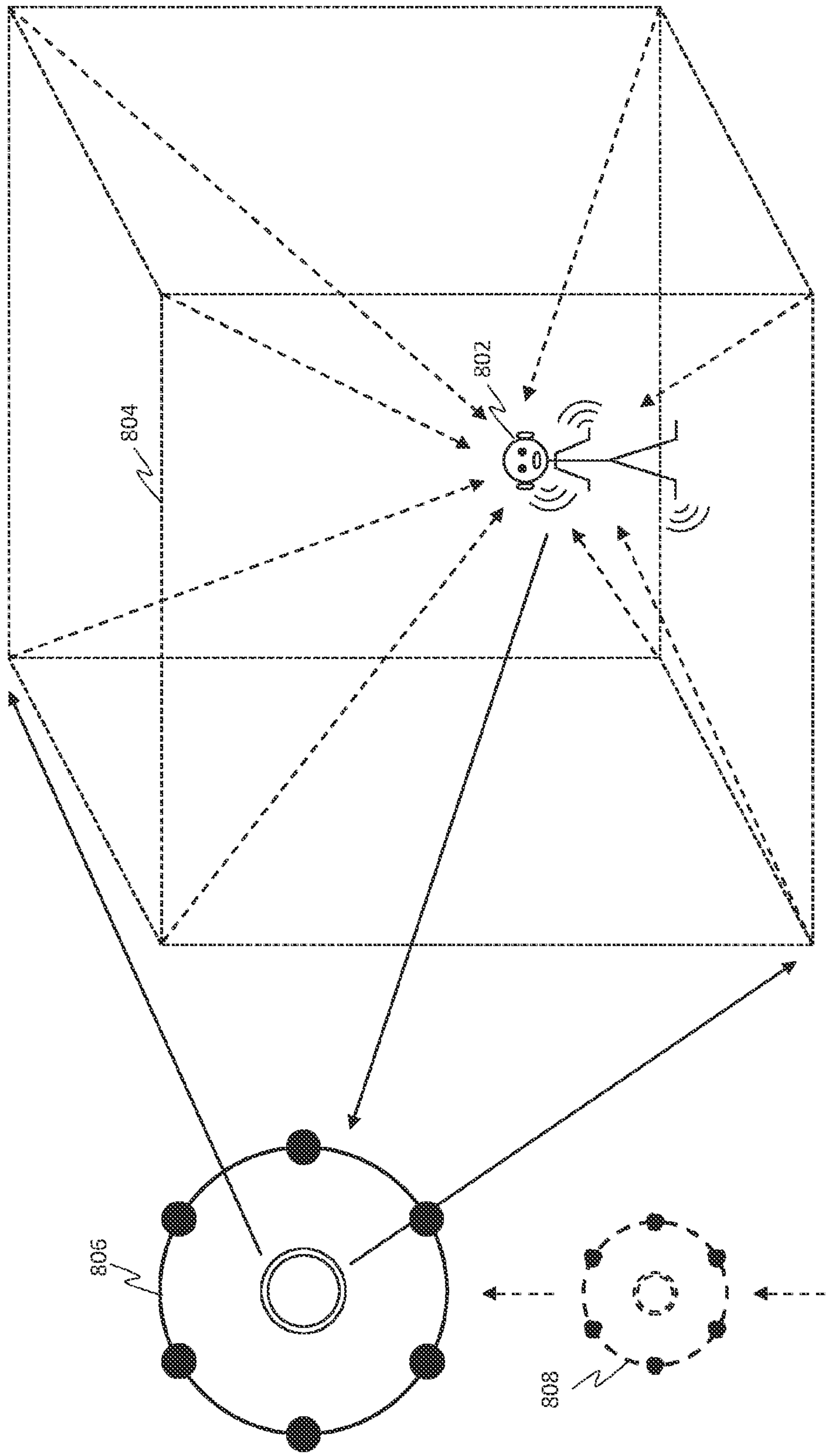
FIG. 8 depicts a human producing sound that is captured and played back by an environmental sound loudspeaker according to an embodiment.

FIG. 8 depicts a human producing sound that is captured and played back by an environmental sound loudspeaker according to an embodiment. In this example, a human subject 802 produces sound, e.g. by using his voice, moving his body, and/or moving around within a physical environment 804. The sounds produced by the subject are captured and immediately played back by an environmental sound loudspeakers 806.

In this and other embodiments, the sounds may additionally be played back by other loudspeakers which are located in the environment and configured together into a loudspeaker system configuration. The other loudspeakers may comprise one or more environmental sound loudspeakers 808.

The played back sounds may be enhanced with added acoustical properties of a virtual environment, e.g., by audio processing the captured environmental sound signal. The audio processing may comprise methods to generate reflections, diffractions, absorption and/or reverberation to the captured sounds, in order to provide an auditive experience of a virtual and/or acoustically augmented and/or acoustically enriched environment. As a result, the subject 802 hears the sound as if diffracted, absorbed, reflecting and/or reverberating in a distinct virtual environment and/or in an acoustically augmented environment, i.e. an acoustically modified and/or enriched version of the real physical environment 804 of the subject. In this way, the human subject's experience of being present in the virtual environment becomes more lifelike compared to a system where the sounds produced by the human subject are not included in the virtual or augmented environment. Consequently, the environmental sound loudspeaker 806 creates a virtual experience that is more physically and emotionally engaging.

Figure 9:
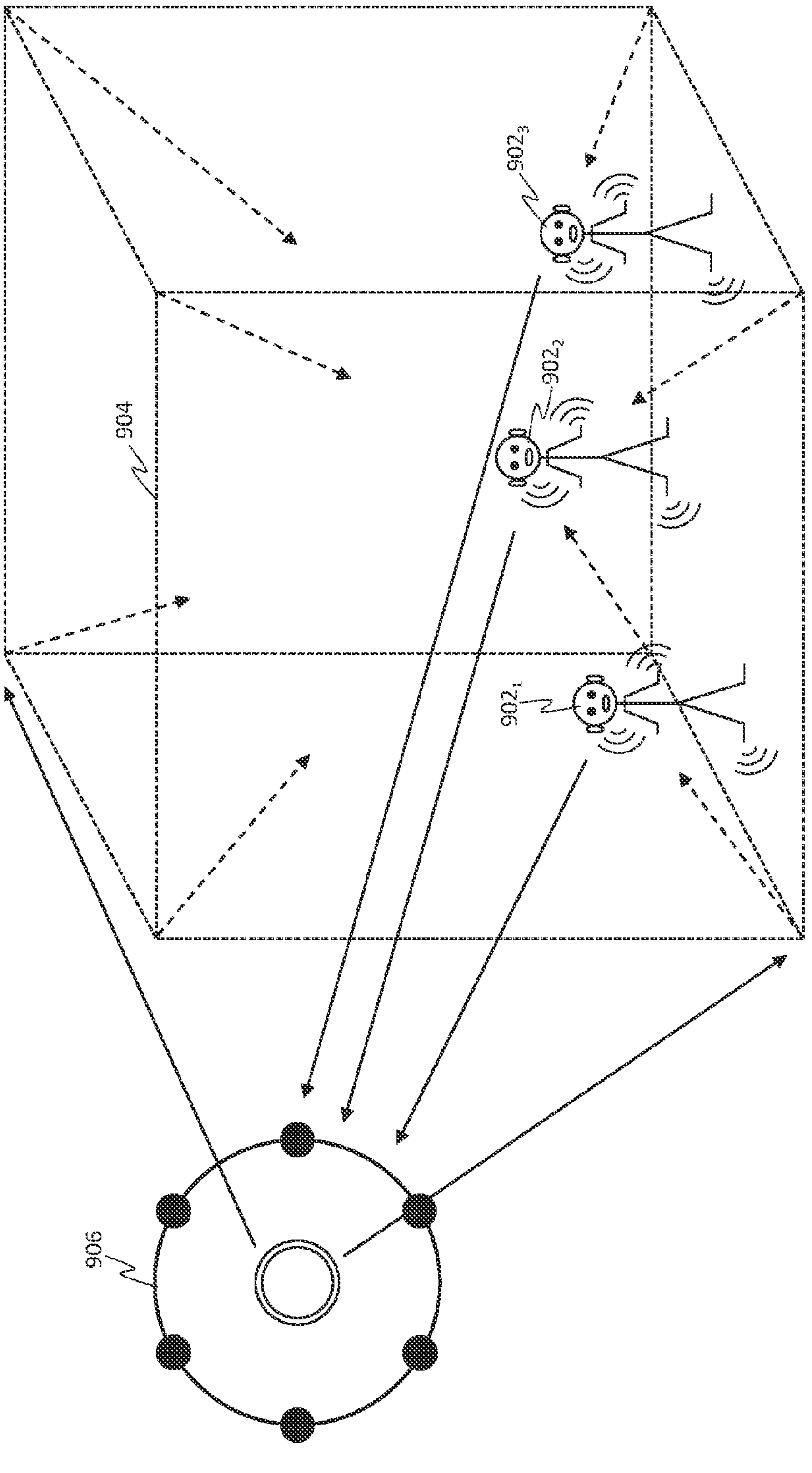
FIG. 9 depicts multiple humans producing sound that is captured and played back by an environmental sound loudspeaker according to an embodiment.

FIG. 9 depicts multiple humans producing sound that is captured and played back by an environmental sound loudspeaker according to an embodiment. In this example, multiple human subjects 902$_{1-3}$, possibly a great many subjects, are situated in the same physical environment 904. Each subject may produce sound by means of voice, making movements and/or walking in the environment. The sounds produced by all subjects are captured and immediately played back by one or more environmental sound loudspeakers 906. Optionally, the sounds may be played back by other loudspeakers which are located in an environment and configured together into a loudspeaker system configuration.

The played back sound signal(s) may be enhanced with added acoustical properties of a virtual environment, e.g., by audio processing the captured environmental sound signal. The audio processing may comprise methods to generate reflections, diffractions, absorption and/or reverberation to provide an auditive experience of a virtual and/or acoustically augmented and/or acoustically enriched environment. As a result, each subject 902$_{1-3}$ hears the sound produced by oneself and each other as if diffracted, absorbed, reflecting and/or reverberating in a distinct virtual environment and/or in an acoustically augmented environment, i.e. an acoustically modified and/or enriched version of the real physical environment 904 of the subjects. This way, the environmental sound loudspeaker 906 makes the experience of human subjects present in one-and-the-same virtual environment more lifelike and consequently, the virtual experience becomes more physically and emotionally engaging.

Figure 10:
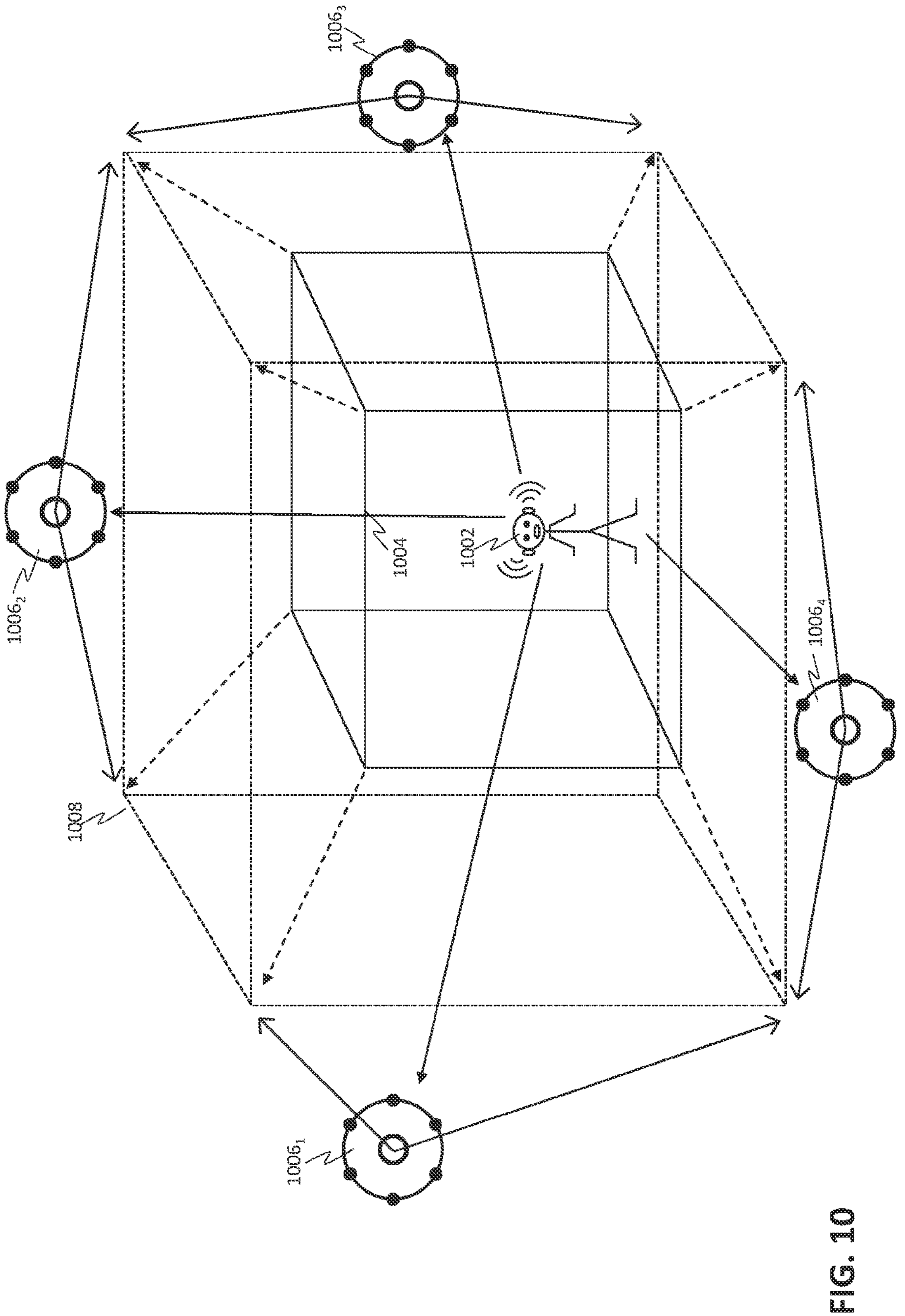
FIG. 10 depicts a human producing musical sound that is captured and played back by an environmental sound loudspeaker according to an embodiment.

FIG. 10 depicts a human producing musical sound that is captured and played back by an environmental sound loudspeaker according to an embodiment. In this example, one or more human subjects 1002 produce musical sound, e.g., a singer performing in a concert hall 1004. The sound produced by the subject and reflecting in the concert hall are captured at various positions and immediately played back by N number of environmental sound loudspeakers 1006$_{1-4}$ with a given time delay Δt. In such configuration, every environmental sound loudspeaker forms its own recording and playback configuration.

As a result, both the one or more human subjects 1002 and any audience present hears the sounds produced in the concert hall 1004 as if produced in a hall 1008 that is magnified in size and loudness. The magnification depends on the time delay, gain and positioning of the environment sound loudspeakers. Thus, environmental sound loudspeakers 1006$_{1-4}$ create an acoustically augmented version of the real physical environment of the subject. Consequently, the acoustic experience of the musical performance in the concert hall improves, e.g., the musical experience becomes more intelligible everywhere in the room and the experienced acoustics of the hall may better match the intended musical performance.

This way, the use of environmental sound loudspeakers constitutes a solution for Active Field Control (AFC) which may be successfully achieved with a simplified and more economic design, i.e., significantly less loudspeakers and microphones and minimized computational power involved compared to conventional AFC systems.

Figure 11:
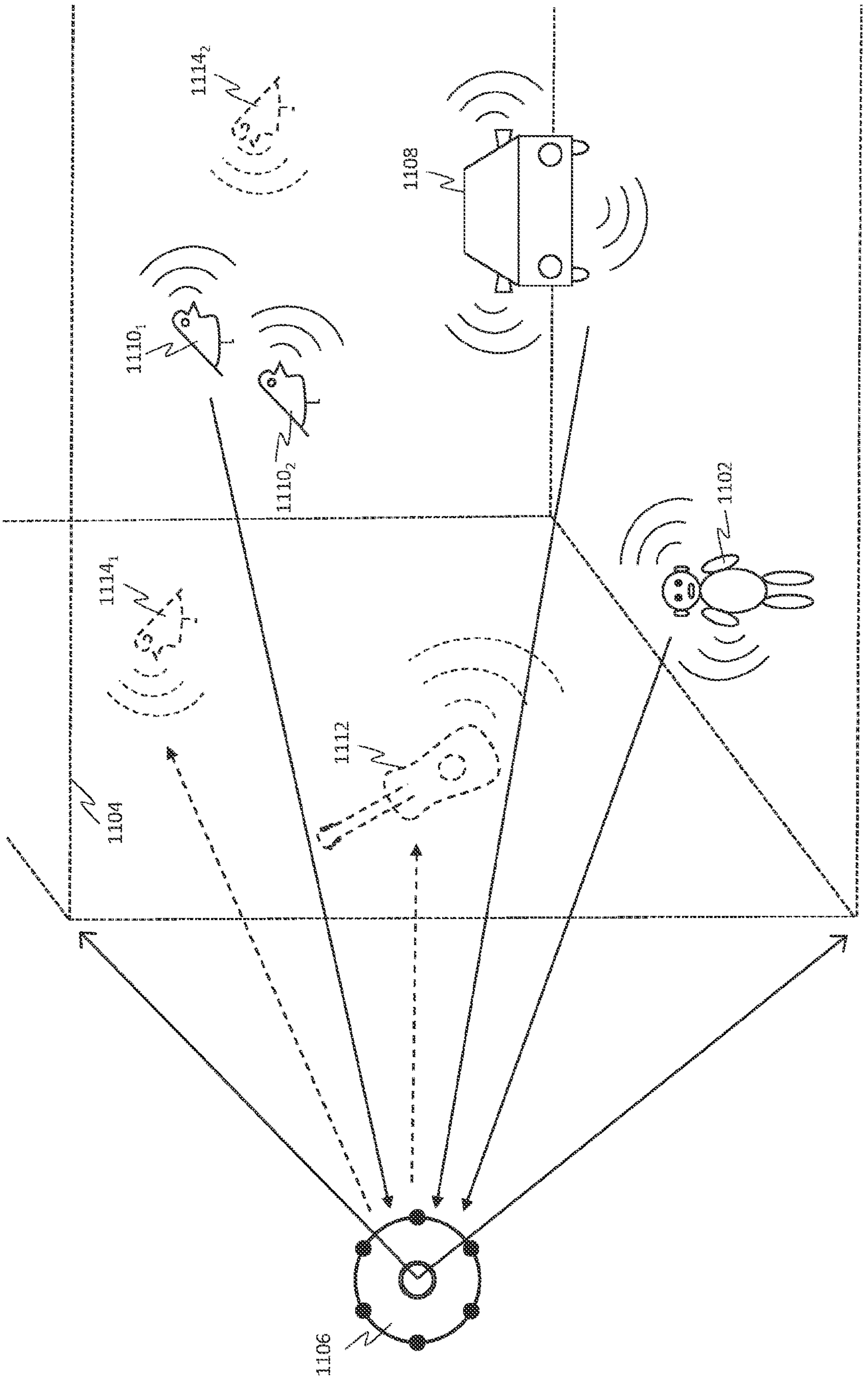
FIG. 11 depicts human and/or non-human sound sources producing sound that is captured and played back by an environmental sound loudspeaker according to an embodiment.

FIG. 11 depicts human and/or non-human sound sources producing sound that is captured and played back by an environmental sound loudspeaker according to an embodiment. In this embodiment, one or more human subjects 1102 and/or one or more non-human subjects such as birds 1110$_{1,2}$, are situated in a physical environment. The human subject may produce sound by means of voice, body movement and/or moving around in the environment 1104. At the same time, other sources may be present in the physical environment that produce sound, such as a car 1108 driving by, the birds 1110$_{1,2}$ chirping etc. The environment sound is captured and immediately played back by one or more environmental sound loudspeakers 1106 and optionally played back by other loudspeakers which are located in an environment and configured together into a loudspeaker system configuration.

The environmental sound loudspeaker 1106 may enhance the played back sounds with added acoustical properties of a virtual environment, e.g. by audio processing of the captured environmental sound signal. The audio processing may comprise methods to generate reflections, diffractions, absorption and/or reverberation to provide an auditive experience of a virtual and/or acoustically augmented and/or acoustically enriched environment. Additionally or alternatively, other virtual sound sources may be added to the played back sound signal(s) to enrich the environment, such as pre-recorded and/or generated voices and/or movements of virtual subjects and/or any other sources e.g. musical sounds such as a guitar 1112, nature sounds such as the chirping of (other) birds 1114$_{1,2}$, etc.

The environmental sound loudspeaker 1106 may enhance the virtual sound sources with the same added acoustical properties of a virtual environment as those added to the real environmental sound. As a result, the subject(s) hear all sound produced in the environment, including the sounds of oneself and all other sound sources in the environment, including the sound produced by the environment sound loudspeaker(s) and optionally other loudspeakers, which may add other virtual sound sources that are not present in the physical environment, as if diffracted, absorbed, reflecting and/or reverberating in a distinct virtual environment and/or in an acoustically augmented environment, i.e. an acoustically modified and/or enriched version of the real physical environment of the subject(s). In this way, subjects may feel more attracted to dwell in a particular environment and this may positively affect or guide the subject's behaviour in the particular environment.

Figure 12:
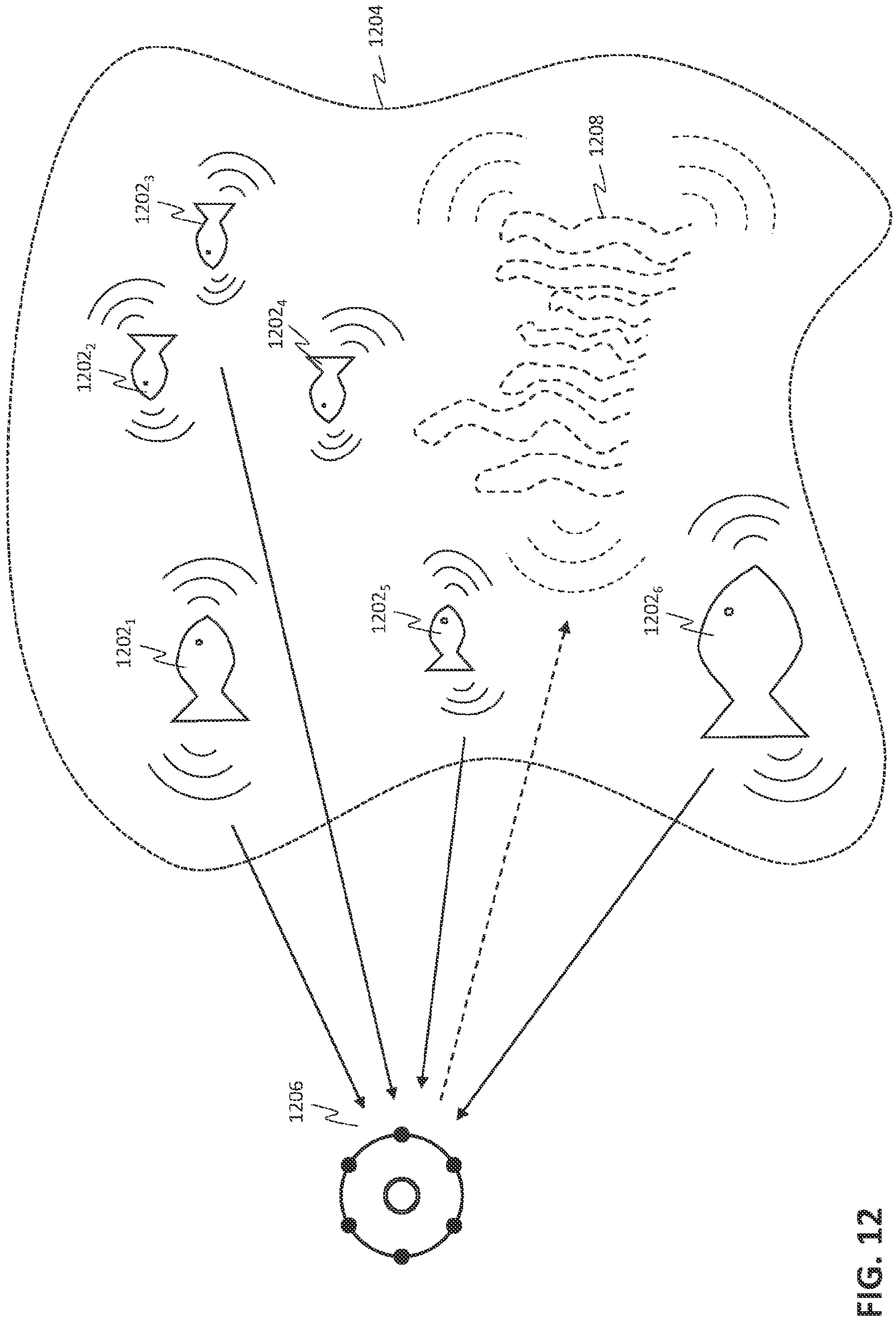
FIG. 12 depicts a use of an environmental sound loudspeaker in an underwater environment.

FIG. 12 depicts a use of an environmental sound loudspeaker in an underwater environment. In this example, multiple non-human subjects, such as a school of fish 1202$_{1-6}$, are situated in an underwater environment. The subjects may produce sound and vibrations by means of voice and movement in the environment 1204. The environment may be enriched with an added virtual sound source of healthy coral reefs 1208 played back by one or more environmental sound loudspeakers 1206 and optionally played back by other loudspeakers. This may attract the subjects to the projected location of the virtual sound source.

The environmental sound loudspeaker 1206 may capture the sound of the subjects 1202$_{1-6}$ at and around the location and may immediately play back the captured sounds. The real-time captured sounds of the subjects, e.g. the school of fish, may be enhanced with added acoustical properties of a virtual environment, e.g. one comprising healthy coral reefs 1208 where healthy coral reefs are mostly absent, by audio processing of the captured environmental sounds. The audio processing may comprise methods to generate reflections, diffractions and/or absorption of the vibrations produced by the fish or other water animals to and from the virtual coral reefs. As a result, the subjects hear the sounds of themselves as if reflecting, diffracted and/or absorbed in the acoustically enriched environment with healthy coral reefs. In this way the subjects may feel more attracted to dwell in the particular area, which may be a means to enhance biodiversity of the particular area.

In this embodiment, the environmental sound loudspeaker 1206 may be adjusted to be waterproof.

Figure 13:
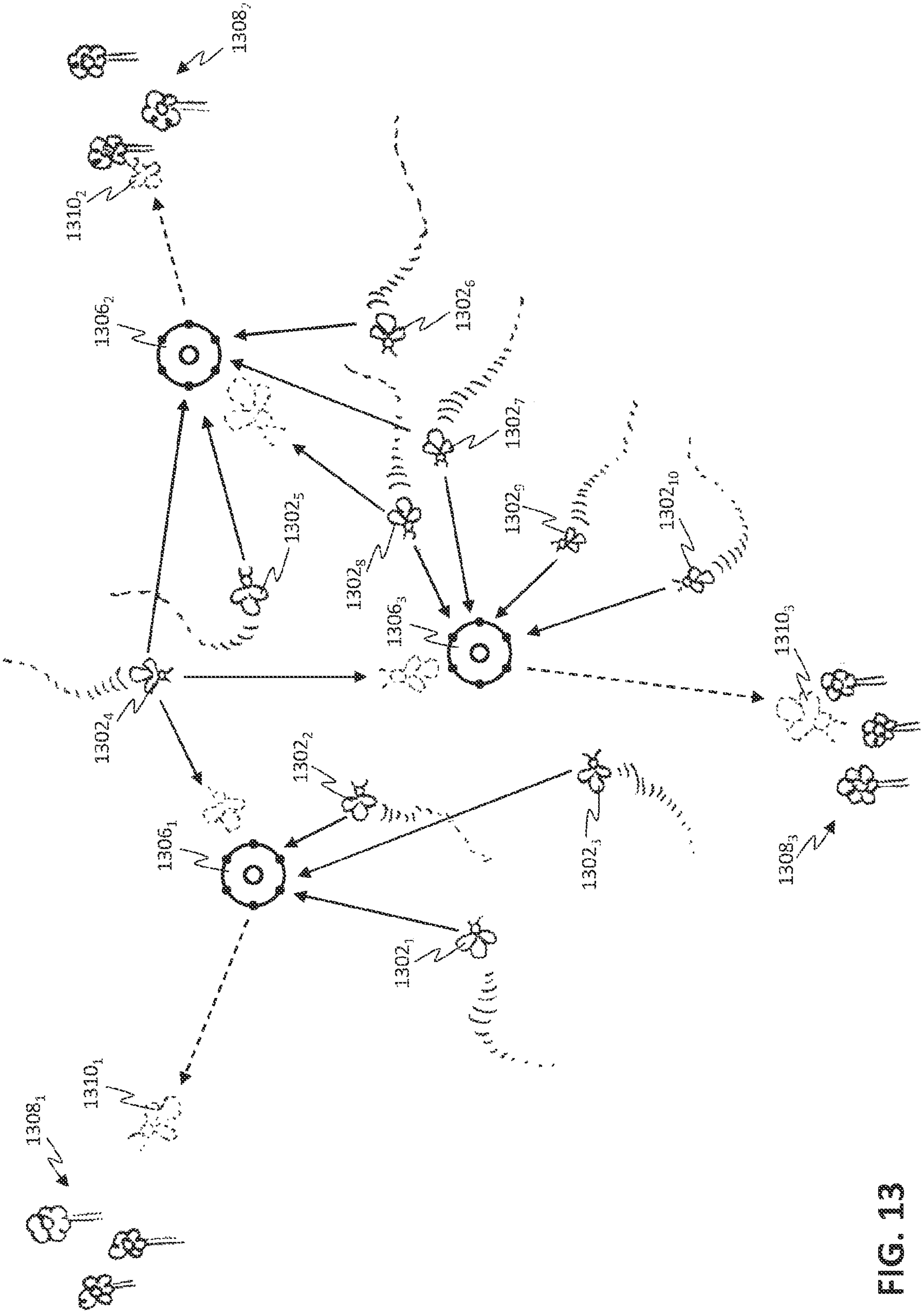
FIG. 13 depicts a use of an environmental sound loudspeaker in an aerial environment.

FIG. 13 describes an embodiment where multiple non-human subjects, such as swarming insects $\mathbf{1302}_{1\text{-}10}$, are situated in a rural environment and the subjects produce sound by means of their movement in the environment. The environment sound is captured by one or more environmental sound loudspeakers $\mathbf{1306}_{1\text{-}3}$ which are flying around and through the swarming insects as drones, coordinated together by real-time data tracking of their location by means of a location sensor and real-time configured in a loudspeaker configuration system.

In such an embodiment, the captured sound of the insects $\mathbf{1302}_{1\text{-}10}$ may function as a spatial audio attractor. For example, the one or more environment sound loudspeakers $\mathbf{1306}_{1\text{-}3}$ may be mobilized as a drone and may be moving towards a location where a particular pre-defined audio signal, e.g. the sound of swarming insects of a particular type, are tracked and captured at the highest intensity. At the same time, the environment may be enriched with an added virtual sound source which comprises frequencies which are particularly attractive to the particular subjects, e.g. a swarm of insects of a particular type, played back by each environmental sound loudspeaker; and as such, the insects and drone-mobilized environmental sound loudspeakers are automatically coupled and attracted to each other. As a result, the subjects are captured together and following the environmental sound loudspeaker. In this way, an environment sound loudspeaker may divert the subjects away from a particular area, e.g. to protect crops from injury of insects eating or burrowing in crops of plants or flowers; or, to guide the subjects towards particular areas, e.g. to stimulate pollination of plants and flowers $\mathbf{1308}_{1\text{-}3}$ by insects in particular areas.

In this embodiment, the environmental sound loudspeakers $\mathbf{1306}_{1\text{-}3}$ may be adjusted to be air-borne, for example by mounting the environmental sound loudspeakers on a drone.

Figure 14:
FIG. 14 is a flow chart depicting a method for recording, processing and immediately replaying sounds according to an embodiment.

FIG. 14 is a flow chart depicting a method for recording, processing and immediately replaying sounds according to an embodiment. The method steps may be performed by an environmental sound loudspeaker as described above, for example with reference to FIG. 1.

In a first step 1402, the method comprises receiving a first input signal from a first microphone and a second input signal from a second microphone, each input signal representing a recorded sound. The first microphone and the second microphone may form a first microphone pair, the first microphone and the second microphone being positioned a distance d apart, the first microphone and the second microphone being positioned diametrically opposite each other and equidistant relative to a centre of a loudspeaker driver.

In an optional second step 1404, the method may comprise receiving a first additional input signal from a first additional microphone and a second additional input signal from a second additional microphone from each of one or more additional microphone pairs. Each additional microphone pair may comprise a first additional microphone and a second additional microphone positioned the distance d apart, the first and second additional microphones in each additional microphone pair being positioned diametrically opposite each other relative to the centre of the loudspeaker driver, the first microphone pair and the one or more additional microphone pairs being arranged symmetrically around the centre of the loudspeaker driver. The first microphone pair and the optional one or more additional microphone may together be referred to as the one or more microphone pairs.

As has been discussed in more detail above, for example with reference to FIG. 6A, the one or more microphone pairs being arranged symmetrically around the centre of the loudspeaker driver may comprise the one or more microphone pairs being distributed equally over a (virtual) circle, the centre of the circle coinciding with the centre of the loudspeaker driver. As has been similarly discussed in more detail above, for example with reference to FIG. 6B, the one or more microphone pairs being arranged symmetrically around the centre of the loudspeaker driver may alternatively comprise the one or more microphone pairs being distributed equally over a (virtual) sphere, the centre of the sphere coinciding with the centre of the loudspeaker driver.

The steps 1402 and 1404 may be combined into a single step comprising receiving one or more first input signals and one or more second input signals from, respectively, a first microphone and a second microphone from each of one or more microphone pairs.

The microphones in the one or more microphone pairs are preferably identical. The microphones in the one or more microphone pairs are preferably omnidirectional microphones. By arranging the one or more microphone pairs symmetrically around the centre of the loudspeaker driver, a substantially omnidirectional polar pattern may be obtained based on a combination of the one or more first and second input signals.

In a step 1406, the method further comprises determining an output signal based on the first and second input signals. The determination of the output signal comprises removing from the one or more input signals, signal components representing sounds produced by the loudspeaker driver, or at least reducing or suppressing those signal components. This way, undesired feedback may be prevented, or at least sufficiently reduced for practical applications as discussed herein. The determination of the output signal further comprises restoring, or at least approximating, the loudness balance or frequency spectrum of the environmental sounds captured by the environmental sound loudspeaker.

In an optional step 1408, the method may further comprise manipulating the output signal. The manipulation preferably comprises adding reverberation and/or virtual acoustics to the output signal. Further examples of manipulation have been discussed above, for example with reference to FIG. 1, in particular with reference to the acoustic module 124. This way, augmented, virtual, or mixed sound effects may be obtained.

In a step 1410, the method comprises providing the, optionally manipulated, output signal to the loudspeaker driver.

The step 1406 may comprise multiple steps 1412-1420. Thus, the determination of the output signal may comprise, in a step 1412, inverting the first input signal and, in an embodiment with more than one microphone pair, inverting each first additional input signal. In a step 1414, the determination of the output signal may comprise combining the inverted first input signal with the second input signal from the same microphone pair. Performing this step for each of the one or more microphone pairs results in one or more combined signals. Each combined signal may be associated with the respective one or more microphone pairs.

In an embodiment with more than one microphone pair, the determination of the output signal may comprise, in a step 1416, applying a phase shift to the combined signal associated with at least one of the one or more microphone pairs. In a step 1418, the phase-shifted signal associated with a first (additional) microphone pair may be combined with a combined signal associated with a second (additional) microphone pair, resulting in a further combined signal. Typically, the combined signals associated with the one or more microphone pairs are combined one by one, possibly in parallel, with a different combined signal or with a further combined, until a single 'fully' combined single is obtained. Before each pairwise combination, at least one of the signals to be combined is phase-shifted to obtain a predetermined phase angle between the two signals to be combined. The predetermined phase angle is based on an angle between axes representative for each of the two signals to be combined. For a combined signal associated with a microphone pair, the representative axis is typically the axis defined by the line between the first and second microphones of the microphone pair.

In a step 1420, the determination of the output signal may further comprise amplifying the (fully) combined signal such that the output signal has a frequency spectrum that is substantially the same as a frequency spectrum of environmental sounds captured by the first and/or second microphones for frequencies in an audible frequency range, preferably substantially all frequencies in the audible frequency range. Preferably, the amplifying comprises attenuating signals with a frequency higher than a first transition frequency, preferably by −3 dB per doubling of the number of microphones. Preferably, the amplifying comprises boosting signals with a frequency lower than a second transition frequency, preferably by +6 dB per octave. The first and second transition frequencies are typically based on the distance d between the first and second microphones in each microphone pair. The second transition frequency may further be based on the number of microphone pairs.

Alternatively or additionally to amplification of the (fully) combined signal, each of the first and second input signals or each of the combined signals associated with the one or more microphone pairs may be amplified.

Figure 15:
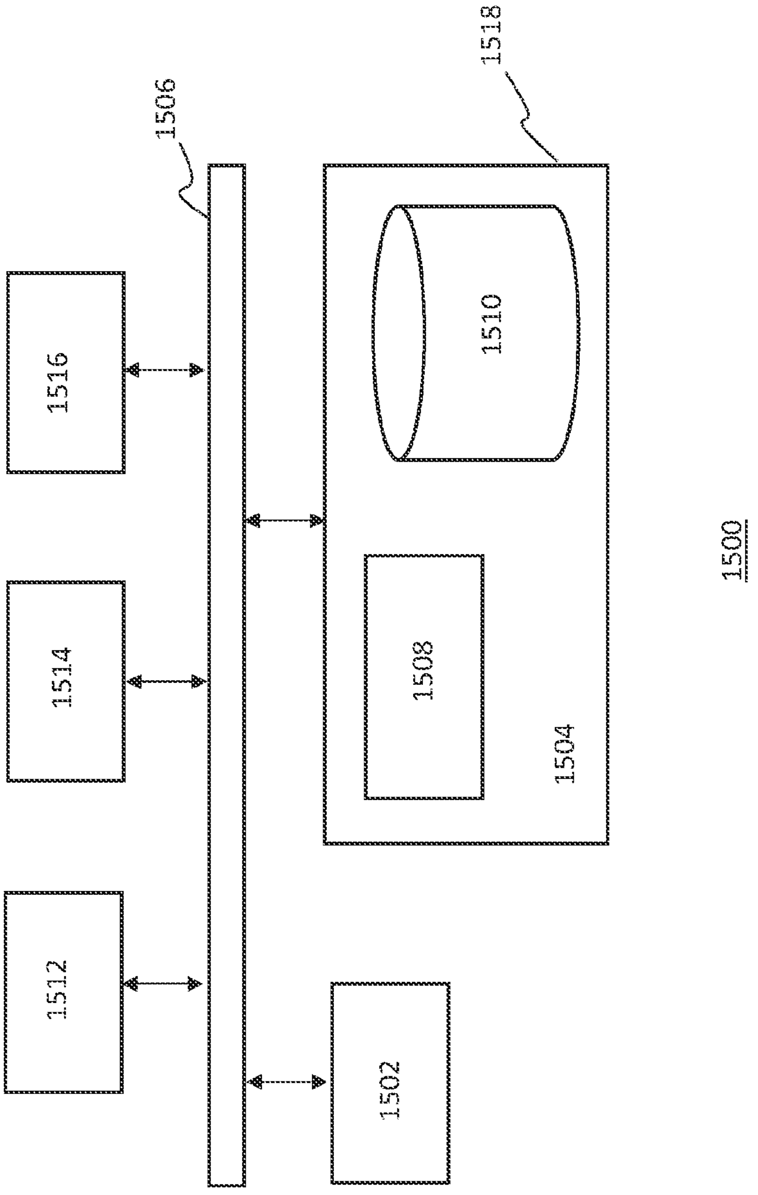
FIG. 15 is a block diagram illustrating a data processing system according to an embodiment.

FIG. 15 is a block diagram illustrating an exemplary data processing system that may be used in embodiments as described in this disclosure. Data processing system 1500 may include at least one processor 1502 coupled to memory elements 1504 through a system bus 1506. As such, the data processing system may store program code within memory elements 1504. Furthermore, processor 1502 may execute the program code accessed from memory elements 1504 via system bus 1506. In one aspect, data processing system may be implemented as a computer that is suitable for storing and/or executing program code. It should be appreciated, however, that data processing system 1500 may be implemented in the form of any system including a processor and memory that is capable of performing the functions described within this specification.

Memory elements 1504 may include one or more physical memory devices such as, for example, local memory 1508 and one or more bulk storage devices 1510. Local memory may refer to random access memory or other non-persistent memory device(s) generally used during actual execution of the program code. A bulk storage device may be implemented as a hard drive or other persistent data storage device. The processing system 1500 may also include one or more cache memories (not shown) that provide temporary storage of at least some program code in order to reduce the number of times program code must be retrieved from bulk storage device 1510 during execution.

Input/output (I/O) devices depicted as input device 1512 and output device 1514 optionally can be coupled to the data processing system. Examples of input device may include, but are not limited to, for example, a keyboard, a pointing device such as a mouse, or the like. Examples of output device may include, but are not limited to, for example, a monitor or display, speakers, or the like. Input device and/or output device may be coupled to data processing system either directly or through intervening I/O controllers. A network adapter 1516 may also be coupled to data processing system to enable it to become coupled to other systems, computer systems, remote network devices, and/or remote storage devices through intervening private or public networks. The network adapter may comprise a data receiver for receiving data that is transmitted by said systems, devices and/or networks to said data and a data transmitter for transmitting data to said systems, devices and/or networks. Modems, cable modems, and Ethernet cards are examples of different types of network adapter that may be used with data processing system 1500.

As pictured in FIG. 15, memory elements 1504 may store an application 1518. It should be appreciated that data processing system 1500 may further execute an operating system (not shown) that can facilitate execution of the application. Application, being implemented in the form of executable program code, can be executed by data processing system 1500, e.g., by processor 1502. Responsive to executing application, data processing system may be configured to perform one or more operations to be described herein in further detail.

In one aspect, for example, data processing system 1500 may represent a client data processing system. In that case, application 1518 may represent a client application that, when executed, configures data processing system 1500 to perform the various functions described herein with reference to a "client". Examples of a client can include, but are not limited to, a personal computer, a portable computer, a mobile phone, or the like. In another aspect, data processing system may represent a server. For example, data processing system may represent a server, a cloud server or a system of (cloud) servers.

Various embodiments of the invention may be implemented as a program product for use with a computer system, where the program(s) of the program product define functions of the embodiments (including the methods described herein). In one embodiment, the program(s) can be contained on a variety of non-transitory computer-readable storage media, where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored. The computer program may be run on the processor 1502 described herein.

The terminology used herein is for the purpose of describing particular embodiments only and is not intended to be limiting of the invention. As used herein, the singular forms "a" "an" and "the" are intended to include the plural forms as well, unless the context clearly indicates otherwise. It will be further understood that the terms "comprises" and/or "comprising" when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration, but is not intended to be exhaustive or limited to the implementations in the form disclosed. Many modifications and variations will be apparent to those of ordinary skill in the art without departing from the scope and spirit of the present invention. The embodiments were chosen and described in order to best explain the principles and some practical applications of the present invention, and to enable others of ordinary skill in the art to understand the present invention for various embodiments with various modifications as are suited to the particular use contemplated.

The invention claimed is:

1. An environmental sound loudspeaker, comprising:
- a loudspeaker driver;
- a first microphone pair, the first microphone pair comprising a first microphone and a second microphone being positioned a distance d apart, the first microphone and the second microphone being positioned diametrically opposite each other and equidistant relative to a center of the loudspeaker driver; and
- a signal processor configured to:
  - receive a first input signal from the first microphone and a second input signal from the second microphone, each input signal representing a recorded sound;
  - determine an output signal based on the first and second input signals; and
  - provide the output signal to the loudspeaker driver;
- wherein the determination of the output signal comprises:
  - inverting the first input signal and combining the inverted first input signal with the second input signal into a combined signal; and
  - amplifying the combined signal and/or the first and second input signals to obtain a high-fidelity signal of environmental sounds captured by the first and/or second microphones for frequencies in an audible frequency range, the amplifying comprising attenuating signals with a frequency higher than a first transition frequency and boosting signals with a frequency lower than a second transition frequency, the first and second transition frequencies being based on the distance d between the first and second microphones.

2. The environmental sound loudspeaker as claimed in claim 1, further comprising:
- one or more additional microphone pairs, each additional microphone pair comprising a first additional microphone and a second additional microphone positioned the distance d apart, the first and second additional microphones in each additional microphone pair being positioned diametrically opposite each other relative to the center of the loudspeaker driver, the first microphone pair and the one or more additional microphone pairs being arranged symmetrically around the center of the loudspeaker driver;
- wherein the signal processor is further configured to, for each of the one or more additional microphone pairs,
- receive a first additional input signal from the first additional microphone and a second additional input signal from the second additional microphone;
- wherein the determination of the output signal further comprises, for each additional microphone pair:
  - inverting the first additional input signal and combining the inverted first additional input signal with the second additional input signal into a combined additional signal;
  - applying a phase shift to the combined additional signal, the phase shift being based on an angle between an axis between the first and second microphones and an additional axis between the first and second additional microphones; and
  - combining the phase-shifted combined additional signal with the combined signal; and
- wherein the second transition frequency is further based on the number of microphone pairs.

3. The environmental sound loudspeaker as claimed in claim 2, wherein the first microphone pair and the one or more additional microphone pairs are equally distributed on a circle, the center of the circle coinciding with the center of the loudspeaker driver, the phase shift $\Delta\varphi_i$ for the i-th additional microphone pair being equal to $\Delta\varphi = i \times 360°/N$, with N the number of microphones.

4. The environmental sound loudspeaker as claimed in claim 2, wherein the first microphone pair and the one or more additional microphone pairs are equally distributed on a sphere, the center of the sphere coinciding with the center of the loudspeaker driver.

5. The environmental sound loudspeaker as claimed in claim 1, wherein the audible frequency range comprises all frequencies between 20 Hz-15 kHz.

6. The environmental sound loudspeaker as claimed in claim 1, wherein the microphones are omnidirectional microphones.

7. The environmental sound loudspeaker as claimed in claim 1, further comprising an acoustic module for sound manipulation.

8. The environmental sound loudspeaker as claimed in claim 1, further comprising an external signal input for receiving an external input signal, the external input signal encoding a sound, and wherein the determination of the output signal further comprises combining the external input signal with the output signal.

9. The environmental sound loudspeaker as claimed in claim 1, wherein the amplifying comprises attenuating signals with a frequency higher than a first transition frequency with −3 dB for the first microphone pair; and/or wherein the amplifying comprises boosting signals with a frequency lower than a second transition frequency with +6 dB per octave; and/or wherein the first transition frequency $f_{t,1}$ is defined by $$f_{t,1} = \frac{v}{2d},$$

and/or wherein the second transition frequency $f_{t,2}$ is approximately equal to $$f_{t,2} = 0.4\frac{v}{\sqrt{N}\,d},$$

wherein v denotes the speed of sound and N denotes the number of microphones.

10. The environmental sound loudspeaker as claimed in claim 1, wherein the amplifying comprises applying a series of low-shelf filters; and/or wherein the amplifying comprises applying a high-shelf filter.

11. The environmental sound loudspeaker as claimed in claim 1, wherein applying a phase shift $\Delta\varphi$ to a signal comprises:

creating a first copy and a second copy of the signal;

applying a Hilbert transform to the first copy to apply a 90° phase shift;

amplifying the first copy with a first factor a, and the second copy with a second factor b; and combining the first and second copies and amplifying the combined copies with a third factor c;

wherein the factors a, b, and c are selected such that $\Delta\varphi=\arctan(a/b)$ and $c=1/\sqrt{(a^2+b^2)}$.

12. The environmental sound loudspeaker as claimed in claim 1, wherein applying a phase shift $\Delta\varphi$ to a signal comprises:

creating a first copy and a second copy of the signal;

applying a first frequency-dependent phase shift $\theta_A(f)$ to the first copy using one or more first all-pass filters with associated first corner frequencies $f_{0,A}(f)$ and first quality factors $Q_A(i)$;

applying a second frequency-dependent phase shift $\theta_B(f)$ to the second copy using one or more second all-pass filters with associated second corner frequencies $f_{0,B}(i)$ and second quality factors $Q_B(i)$:

and taking a difference between the first and second phase-shifted copies;

wherein the first and second corner frequencies and/or the first and second quality factors are optimised such that $\Delta\varphi\approx\theta_A(f)-\theta_B(f)$ for all/in the audible frequency range.

13. A method for recording, processing and immediately replaying sounds, the method comprising:

receiving a first input signal from a first microphone and a second input signal from a second microphone, each input signal representing a recorded sound, the first microphone and the second microphone forming a first microphone pair, the first microphone and the second microphone being positioned a distance d apart, the first microphone and the second microphone being positioned diametrically opposite each other and equidistant relative to a center of a loudspeaker driver;

determining an output signal based on the first and second input signals; and providing the output signal to the loudspeaker driver;

wherein the determination of the output signal comprises:

inverting the first input signal and combining the inverted first input signal with the second input signal into a combined signal; and amplifying the combined signal and/or the first and second input signals to obtain a high-fidelity signal of environmental sounds captured by the first and/or second microphones for frequencies in an audible frequency range, the amplifying comprising attenuating signals with a frequency higher than a first transition frequency and boosting signals with a frequency lower than a second transition frequency, the first and second transition frequencies being based on the distance d between the first and second microphones.

14. The method as claimed in claim 13, further comprising:

receiving a first additional input signal from a first additional microphone and a second additional input signal from a second additional microphone from each of one or more additional microphone pairs, each additional microphone pair comprising a first additional microphone and a second additional microphone positioned the distance d apart, the first and second additional microphones in each additional microphone pair being positioned diametrically opposite each other relative to the center of the loudspeaker driver, the first microphone pair and the one or more additional microphone pairs being arranged symmetrically around the center of the loudspeaker driver;

wherein the determination of the output signal further comprises, for each additional microphone pair:

inverting the first additional input signal and combining the inverted first additional input signal with the second additional input signal into a combined additional signal;

applying a phase shift to the combined additional signal, the phase shift being based on an angle between an axis between the first and second microphones and an additional axis between the first and second additional microphones; and combining the phase-shifted combined additional signal with the combined signal; and wherein the second transition frequency is further based on the number of microphone pairs.

15. A computer comprising a computer readable storage medium having computer readable program code embodied therewith, and a processor coupled to the computer readable storage medium, wherein responsive to executing the computer readable program code, the processor is configured to perform the method as claimed in claim 13.

16. A non-transitory computer-readable storage medium storing at least one software code portion, the software code portion, when executed or processed by a computer, is configured to perform the method as claimed in claim 13.

17. The method of claim 13, further comprising manipulating the output signal, the manipulation preferably comprising adding reverberation and/or virtual acoustics to the output signal.

18. The environmental sound loudspeaker as claimed in claim 3, wherein the environmental sound loudspeaker comprises exactly one additional microphone pair placed orthogonally to the first microphone pair and the phase shift being equal to 90°.

19. The environmental sound loudspeaker as claimed in claim 4, wherein the environmental sound loudspeaker comprises exactly two additional microphone pairs, the first microphone pair and the two additional microphone pairs being placed on the axes of a cartesian coordinate system with an origin in the center of the loudspeaker driver and the phase shift being equal to 90°.

* * * * *